US012550195B2

(12) United States Patent
Dallal et al.

(10) Patent No.: US 12,550,195 B2
(45) Date of Patent: Feb. 10, 2026

(54) REDUCED OVERHEAD BEAM SWEEP FOR INITIAL ACCESS

(71) Applicant: QUALCOMM Incorporated, San Diego, CA (US)

(72) Inventors: Yehonatan Dallal, Kfar Saba (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/397,690

(22) Filed: Aug. 9, 2021

(65) Prior Publication Data

US 2023/0043953 A1 Feb. 9, 2023

(51) Int. Cl.
*H04B 7/06* (2006.01)
*H04W 16/28* (2009.01)
*H04W 56/00* (2009.01)
*H04W 74/0833* (2024.01)

(52) U.S. Cl.
CPC .... *H04W 74/0833* (2013.01); *H04B 7/06952* (2023.05); *H04W 16/28* (2013.01); *H04W 56/001* (2013.01)

(58) Field of Classification Search
CPC .......... H04B 7/01; H04B 7/04; H04B 7/0408; H04B 7/0608; H04B 7/0617; H04B 7/0619; H04B 7/0686; H04B 7/0695; H04B 7/088; H04B 7/0857; H04W 56/00; H04W 56/001; H04W 56/002; H04W 56/0095; H04W 74/0833; H04W 74/0841; H04W 76/19; H04W 76/20; H04W 76/27; H04W 76/34; H04W 24/10
See application file for complete search history.

(56) References Cited

U.S. PATENT DOCUMENTS

| | | | |
|---|---|---|---|
| 2019/0238201 A1* | 8/2019 | Nilsson | H04B 7/088 |
| 2019/0289639 A1* | 9/2019 | Frenger | H04W 72/046 |
| 2020/0275479 A1* | 8/2020 | Peisa | H04W 74/04 |
| 2020/0358515 A1* | 11/2020 | Li | H04W 16/28 |
| 2020/0395683 A1* | 12/2020 | Cao | H01Q 3/2605 |

(Continued)

FOREIGN PATENT DOCUMENTS

WO WO-2021032267 A1 * 2/2021 ........... H04B 7/0626

*Primary Examiner* — Kibrom T Hailu
*Assistant Examiner* — Scott A Schlack
(74) *Attorney, Agent, or Firm* — Holland & Hart LLP/Qualcomm Incorporated

(57) ABSTRACT

Methods, systems, and devices for wireless communications are described. In some wireless communications systems, a user equipment (UE) may receive a system information message from a base station indicating a beam sweeping procedure supported by the base station. Based on the system information message, the UE may receive, as part of the indicated beam sweeping procedure, a first synchronization signal block (SSB) as part of first set of SSBs, and a second SSB as part of a second set of SSBs. The UE may then transmit, to the base station, one or more messages that indicate a narrow beam for communications between the UE and the base station. In some cases, the indicated beam may correspond to the first SSB and the second SSB, and is indicated on one or more random access channel (RACH) occasions associated with the beam sweeping procedure.

20 Claims, 18 Drawing Sheets

(56) References Cited

U.S. PATENT DOCUMENTS

| | | | |
|---|---|---|---|
| 2021/0136703 A1* | 5/2021 | Kundargi | H04W 72/23 |
| 2022/0123824 A1* | 4/2022 | Lee | H04B 17/309 |
| 2022/0247474 A1* | 8/2022 | Rune | H04B 7/0617 |
| 2023/0013213 A1* | 1/2023 | Nilsson | H04B 7/0695 |
| 2023/0027215 A1* | 1/2023 | Nilsson | H04B 7/0695 |
| 2024/0014868 A1* | 1/2024 | Sabouri-Sichani | H04B 7/0608 |

* cited by examiner

REDUCED OVERHEAD BEAM SWEEP FOR INITIAL ACCESS

FIELD OF TECHNOLOGY

The following relates to wireless communications, including reduced overhead beam sweep for initial access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may use beam sweeping techniques as part of beam forming operations. For example, a base station may use multiple antennas or antenna arrays (e.g., antenna panels) to conduct beamforming operations for directional communications with a UE. Some beam sweeping techniques, however, may be lengthy while having high signaling overhead.

SUMMARY

The described techniques relate to improved methods, systems, devices, and apparatuses that support reduced overhead beam sweep for initial access. Generally, the described techniques provide for increasing the efficiency of beam sweeping procedures by reducing overall signaling overhead and employing various techniques for beam selection reporting. In some such examples, a base station may transmit a system information message (e.g., a master information block (MIB), a remaining minimum system information (RMSI)) to a user equipment (UE) which indicates a beam sweeping procedure supported by the base station. The UE may then receive a set of synchronization signal blocks (SSBs) in a beam sweep, including a first SSB and a second SSB. For example, in some systems, the base station may generate a synchronization signal burst by beamforming a number of SSBs to sweep both azimuth and elevation directions. The UE may measure a signal strength of the set of SSBs to determine a pair of SSBs or SSB indices (e.g., one SSB corresponding to azimuth and one SSB corresponding to elevation) which have the highest signal strength. The UE may then transmit one or more messages indicating a beam for communications between the UE and the base station. In some examples, the one or more messages may include an SSB index pair which indicates the selected elevation and azimuth directions for which to establish a narrow beam.

The UE may report the SSB index pair on one or more random access channel (RACH) occasions to the base station. In some cases, for example, the UE may transmit the SSB index in the same RACH occasion or in different RACH occasions. In some examples, the UE may transmit one SSB index during a RACH occasion symbol and another SSB by a RACH occasion frequency allocation. In some other examples, one or more SSB indices may be conveyed in a RACH preamble. The base station may receive the SSB index pair from the UE, and may register the UE on a narrow beam corresponding to the SSB index pair.

A method for wireless communications at a user equipment (UE) is described. The method may include receiving, from a base station, a system information message indicating a type of a beam sweeping procedure supported by the base station, receiving, as part of the beam sweeping procedure, a first synchronization signal of a first set of synchronization signals of the beam sweeping procedure, receiving, as part of the beam sweeping procedure, a second synchronization signal of a second set of synchronization signals of the beam sweeping procedure, and transmitting, to the base station during one or more RACH occasions associated with the beam sweeping procedure, one or more messages indicating a beam for communications between the UE and the base station, the beam corresponding to both the first synchronization signal and the second synchronization signal.

An apparatus for wireless communications at a UE is described. The apparatus may include a processor, memory coupled with the processor, and instructions stored in the memory. The instructions may be executable by the processor to cause the apparatus to receive, from a base station, a system information message indicating a type of a beam sweeping procedure supported by the base station, receive, as part of the beam sweeping procedure, a first synchronization signal of a first set of synchronization signals of the beam sweeping procedure, receive, as part of the beam sweeping procedure, a second synchronization signal of a second set of synchronization signals of the beam sweeping procedure, and transmit, to the base station during one or more RACH occasions associated with the beam sweeping procedure, one or more messages indicating a beam for communications between the UE and the base station, the beam corresponding to both the first synchronization signal and the second synchronization signal.

Another apparatus for wireless communications at a UE is described. The apparatus may include means for receiving, from a base station, a system information message indicating a type of a beam sweeping procedure supported by the base station, means for receiving, as part of the beam sweeping procedure, a first synchronization signal of a first set of synchronization signals of the beam sweeping procedure, means for receiving, as part of the beam sweeping procedure, a second synchronization signal of a second set of synchronization signals of the beam sweeping procedure, and means for transmitting, to the base station during one or more RACH occasions associated with the beam sweeping procedure, one or more messages indicating a beam for communications between the UE and the base station, the beam corresponding to both the first synchronization signal and the second synchronization signal.

A non-transitory computer-readable medium storing code for wireless communications at a UE is described. The code may include instructions executable by a processor to receive, from a base station, a system information message indicating a type of a beam sweeping procedure supported by the base station, receive, as part of the beam sweeping procedure, a first synchronization signal of a first set of synchronization signals of the beam sweeping procedure, receive, as part of the beam sweeping procedure, a second synchronization signal of a second set of synchronization signals of the beam sweeping procedure, and transmit, to the base station during one or more RACH occasions associated with the beam sweeping procedure, one or more messages indicating a beam for communications between the UE and the base station, the beam corresponding to both the first synchronization signal and the second synchronization signal.

Some examples of the method, apparatuses, and non-transitory computer-readable medium described herein may further include operations, features, means, or instructions for transmitting, to the base station during a first RACH occasion, a first message including a first synchronization signal index corresponding to the first synchronization signal and a second synchronization signal index corresponding to the second synchronization signal.

Some examples of the method, apparatuses, and non-transitory computer-readable medium described herein may further include operations, features, means, or instructions for transmitting, to the base station in a first RACH occasion, a first message including a first synchronization signal index corresponding to the first synchronization signal and transmitting, to the base station in a second RACH occasion, a second message including a second synchronization signal index corresponding to the second synchronization signal.

In some examples of the method, apparatuses, and non-transitory computer-readable medium described herein, the first RACH occasion may be different from the second RACH occasion.

In some examples of the method, apparatuses, and non-transitory computer-readable medium described herein, the beam sweeping procedure includes a first beam sweep and a second beam sweep and the method, apparatuses, and non-transitory computer-readable medium may include further operations, features, means, or instructions for receiving the first set of synchronization signals during the first beam sweep according to a set of multiple elevation coordinates and receiving the second set of synchronization signals during the second beam sweep according to a set of multiple azimuthal coordinates.

Some examples of the method, apparatuses, and non-transitory computer-readable medium described herein may further include operations, features, means, or instructions for transmitting a first synchronization signal index corresponding to the first synchronization signal during a first time period corresponding to the first beam sweep and transmitting a second synchronization signal index corresponding to the second synchronization signal during a second time period corresponding to the second beam sweep.

Some examples of the method, apparatuses, and non-transitory computer-readable medium described herein may further include operations, features, means, or instructions for transmitting, to the base station, a first synchronization signal index corresponding to the first synchronization signal during a RACH occasion symbol and transmitting, to the base station, a second synchronization signal index corresponding to the second synchronization signal during a RACH occasion frequency allocation.

Some examples of the method, apparatuses, and non-transitory computer-readable medium described herein may further include operations, features, means, or instructions for transmitting, to the base station, a first synchronization signal index corresponding to the first synchronization signal during a first RACH occasion and transmitting, to the base station, a second synchronization signal index corresponding to the second synchronization signal in a RACH preamble of a RACH transmission associated with the one or more RACH occasions.

In some examples of the method, apparatuses, and non-transitory computer-readable medium described herein, the first set of synchronization signals may be associated with a set of multiple elevation coordinates and the second set of synchronization signals may be associated with a set of multiple azimuthal coordinates.

Some examples of the method, apparatuses, and non-transitory computer-readable medium described herein may further include operations, features, means, or instructions for receiving, from the base station, a downlink message on the beam corresponding to both the first synchronization signal and the second synchronization signal based on the beam sweeping procedure.

In some examples of the method, apparatuses, and non-transitory computer-readable medium described herein, the first set of synchronization signals and the second set of synchronization signals may be mapped to respective RACH occasions of the one or more RACH occasions based on the beam sweeping procedure.

A method for wireless communications at a base station is described. The method may include transmitting, to a UE, a system information message indicating a type of a beam sweeping procedure supported by the base station, transmitting, as part of the beam sweeping procedure, a first synchronization signal of a first set of synchronization signals of the beam sweeping procedure, transmitting, as part of the beam sweeping procedure, a second synchronization signal of a second set of synchronization signals of the beam sweeping procedure, and receiving, from the UE during one or more RACH occasions associated with the beam sweeping procedure, one or more messages indicating a beam for communications between the UE and the base station, the beam corresponding to both the first synchronization signal and the second synchronization signal.

An apparatus for wireless communications at a base station is described. The apparatus may include a processor, memory coupled with the processor, and instructions stored in the memory. The instructions may be executable by the processor to cause the apparatus to transmit, to a UE, a system information message indicating a type of a beam sweeping procedure supported by the base station, transmit, as part of the beam sweeping procedure, a first synchronization signal of a first set of synchronization signals of the beam sweeping procedure, transmit, as part of the beam sweeping procedure, a second synchronization signal of a second set of synchronization signals of the beam sweeping procedure, and receive, from the UE during one or more RACH occasions associated with the beam sweeping procedure, one or more messages indicating a beam for communications between the UE and the base station, the beam corresponding to both the first synchronization signal and the second synchronization signal.

Another apparatus for wireless communications at a base station is described. The apparatus may include means for transmitting, to a UE, a system information message indicating a type of a beam sweeping procedure supported by the base station, means for transmitting, as part of the beam sweeping procedure, a first synchronization signal of a first set of synchronization signals of the beam sweeping procedure, means for transmitting, as part of the beam sweeping procedure, a second synchronization signal of a second set of synchronization signals of the beam sweeping procedure, and means for receiving, from the UE during one or more RACH occasions associated with the beam sweeping procedure, one or more messages indicating a beam for communications between the UE and the base station, the beam corresponding to both the first synchronization signal and the second synchronization signal.

A non-transitory computer-readable medium storing code for wireless communications at a base station is described. The code may include instructions executable by a processor to transmit, to a UE, a system information message indicating a type of a beam sweeping procedure supported by the base station, transmit, as part of the beam sweeping procedure, a first synchronization signal of a first set of synchronization signals of the beam sweeping procedure, transmit, as part of the beam sweeping procedure, a second synchronization signal of a second set of synchronization signals of the beam sweeping procedure, and receive, from the UE during one or more RACH occasions associated with the beam sweeping procedure, one or more messages indicating a beam for communications between the UE and the base station, the beam corresponding to both the first synchronization signal and the second synchronization signal.

Some examples of the method, apparatuses, and non-transitory computer-readable medium described herein may further include operations, features, means, or instructions for receiving, from the UE during a first RACH occasion, a first message including a first synchronization signal index corresponding to the first synchronization signal and a second synchronization signal index corresponding to the second synchronization signal.

Some examples of the method, apparatuses, and non-transitory computer-readable medium described herein may further include operations, features, means, or instructions for receiving, from the UE in a first RACH occasion, a first message including a first synchronization signal index corresponding to the first synchronization signal and receiving, from the UE in a second RACH occasion, a second message including a second synchronization signal index corresponding to the second synchronization signal.

In some examples of the method, apparatuses, and non-transitory computer-readable medium described herein, the first RACH occasion may be different from the second RACH occasion.

In some examples of the method, apparatuses, and non-transitory computer-readable medium described herein, the beam sweeping procedure includes a first beam sweep and a second beam sweep and the method, apparatuses, and non-transitory computer-readable medium may include further operations, features, means, or instructions for transmitting, to the UE, the first set of synchronization signals during the first beam sweep according to a set of multiple elevation coordinates and transmitting, to the UE, the second set of synchronization signals during the second beam sweep according to a set of multiple azimuthal coordinates.

Some examples of the method, apparatuses, and non-transitory computer-readable medium described herein may further include operations, features, means, or instructions for receiving a first synchronization signal index corresponding to the first synchronization signal during a first time period corresponding to the first beam sweep and receiving a second synchronization signal index corresponding to the second synchronization signal during a second time period corresponding to the second beam sweep.

Some examples of the method, apparatuses, and non-transitory computer-readable medium described herein may further include operations, features, means, or instructions for receiving, from the UE, a first synchronization signal index corresponding to the first synchronization signal during a RACH occasion symbol and transmitting, to the UE, a second synchronization signal index corresponding to the second synchronization signal during a RACH occasion frequency allocation.

Some examples of the method, apparatuses, and non-transitory computer-readable medium described herein may further include operations, features, means, or instructions for receiving, from the UE, a first synchronization signal index corresponding to the first synchronization signal during a first RACH occasion and receiving, from the UE, a second synchronization signal index corresponding to the second synchronization signal in a RACH preamble of a RACH transmission associated with the one or more RACH occasions.

In some examples of the method, apparatuses, and non-transitory computer-readable medium described herein, the first set of synchronization signals may be associated with a set of multiple elevation coordinates and the second set of synchronization signals may be associated with a set of multiple azimuthal coordinates.

Some examples of the method, apparatuses, and non-transitory computer-readable medium described herein may further include operations, features, means, or instructions for transmitting, to the UE, a downlink message on the beam corresponding to both the first synchronization signal and the second synchronization signal based on the beam sweeping procedure.

In some examples of the method, apparatuses, and non-transitory computer-readable medium described herein, the first set of synchronization signals and the second set of synchronization signals may be mapped to respective RACH occasions of the one or more RACH occasions based on the beam sweeping procedure.

DETAILED DESCRIPTION

Figure 1:
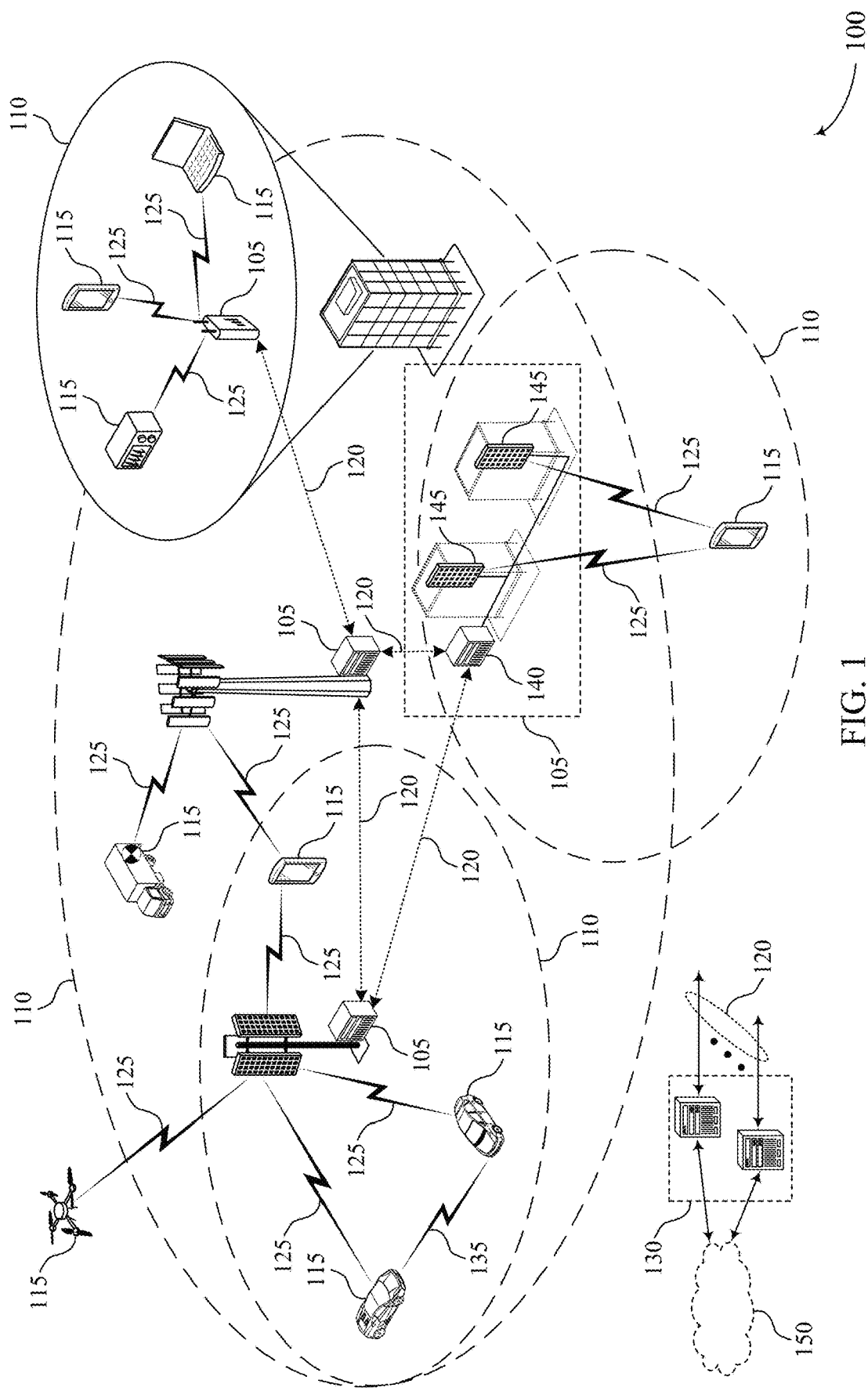
FIGS. 1 and 2 illustrate examples of a wireless communications system that supports reduced overhead beam sweep for initial access in accordance with aspects of the present disclosure.

In some wireless communications systems, wireless devices such as a user equipment (UE) and a base station may implement a number of beam-management techniques to establish initial access and maintain beamformed communications. In some such beam-management techniques, the base station may transmit a set of synchronization signal blocks (SSBs) in a beam sweep to the UE. For example, in high frequency system (e.g., a millimeter wave systems such as 5G/new radio (NR) systems) that uses narrow beams, the base station may generate a synchronization signal burst by beamforming a number of SSBs to sweep both azimuth and elevation directions, and then transmits the beamformed signal to the UE. The UE may receive the SSBs over multiple receive beams and measure a signal strength (e.g., reference signal receive power (RSRP)) for each transmit-receive beam pair. In such cases, the UE may select the transmit-receive beam pair with the maximum strength to use for initial access, and respond to the base station using a random access channel (RACH) occasion corresponding to the strongest SSB.

In some cases, however, the beam sweeping procedure performed by the base station may include sweeping a large number of narrow beams (e.g., up to 64 beams or greater) in the direction of the UE, which is a lengthy process that undesirably increases beam sweeping (e.g., signaling) overhead. Thus to increase the efficiency of the beam sweeping procedure and the reduce overhead, the base station may reduce the number of beams used to perform the beam sweep, and the UE may implement a number of different techniques to report an indication of the narrow beam selected for initial access. For example, the base station may sweep a smaller number of wide beams over azimuth and elevation directions (e.g., 4 beams or a different subset of the large number of narrow beams in different elevation directions, 4 beams or a different subset of the large number of narrow beams at different azimuth directions) corresponding to respective SSBs. The UE may perform measurements for each SSB, and may determine a pair of SSBs (e.g., corresponding to an elevation direction and an azimuth direction) having the highest RSRP or otherwise highest signal strength and signal quality. The UE may report the selected SSBs in the form of an SSB index pair on one or more RACH occasions to the base station, and the base station may register the UE on a narrow beam corresponding to the elevation and azimuth directions indicated by the SSB index pair.

In some cases, for example, the UE may transmit the pair of SSB indices to the base station to the same RACH occasion or the UE may transmit each SSB index of the pair of SSB indices in different RACH occasions. In some examples, the UE may indicate one SSB index during a RACH occasion symbol and another SSB by RACH occasion frequency allocation. In some other examples, one or more SSB indices may be conveyed in a RACH preamble.

Aspects of the disclosure are initially described in the context of wireless communications systems. Aspects of the disclosure are further illustrated by and described with reference to apparatus diagrams, system diagrams, a beam sweep configuration diagram, a process flow, and flowcharts that relate to reduced overhead beam sweep for initial access.

FIG. 1 illustrates an example of a wireless communications system 100 that supports reduced overhead beam sweep for initial access in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 and a base station 105 may perform various beam-management techniques to establish and maintain beamformed communications. In some such examples, the base station 105 may transmit a set of SSBs in a beam sweep to the UE 115. For example, in some systems, the base station 105 may generate a synchronization signal burst by beamforming a number of SSBs to sweep both azimuth and elevation directions. The UE 115 may select an SSB with the maximum signal strength to use for initial access, and may respond to the base station using a random access channel (RACH) occasion corresponding to the strongest SSB.

To increase the efficiency of the beam sweeping procedure and the reduce beam sweeping overhead, the base station 105 may reduce the number of beams used to perform the beam sweep. For example, the base station 105 may sweep a smaller number of wide beams over azimuth and elevation directions (e.g., 4 beams in different elevation directions, 4 beams at different azimuth directions) corresponding to respective SSBs. The UE 115 may perform measurements for each SSB, and may determine a pair of SSBs (e.g., corresponding to an elevation direction and an azimuth direction) having the highest. The UE 115 may report the selected SSBs in the form of an SSB index pair on one or more RACH occasions to the base station. In some cases, for example, the UE 115 may transmit the pair of SSB in the same RACH occasion or in different RACH occasions. In some examples, the UE 115 may transmit one SSB index during a RACH occasion symbol and another SSB by RACH occasion frequency allocation. In some other examples, one or more SSB indices may be conveyed in a RACH preamble. The base station 105 may receive the SSB index pair from the UE 115, and may register the UE 115 on a narrow beam corresponding to the SSB index pair.

Figure 2:
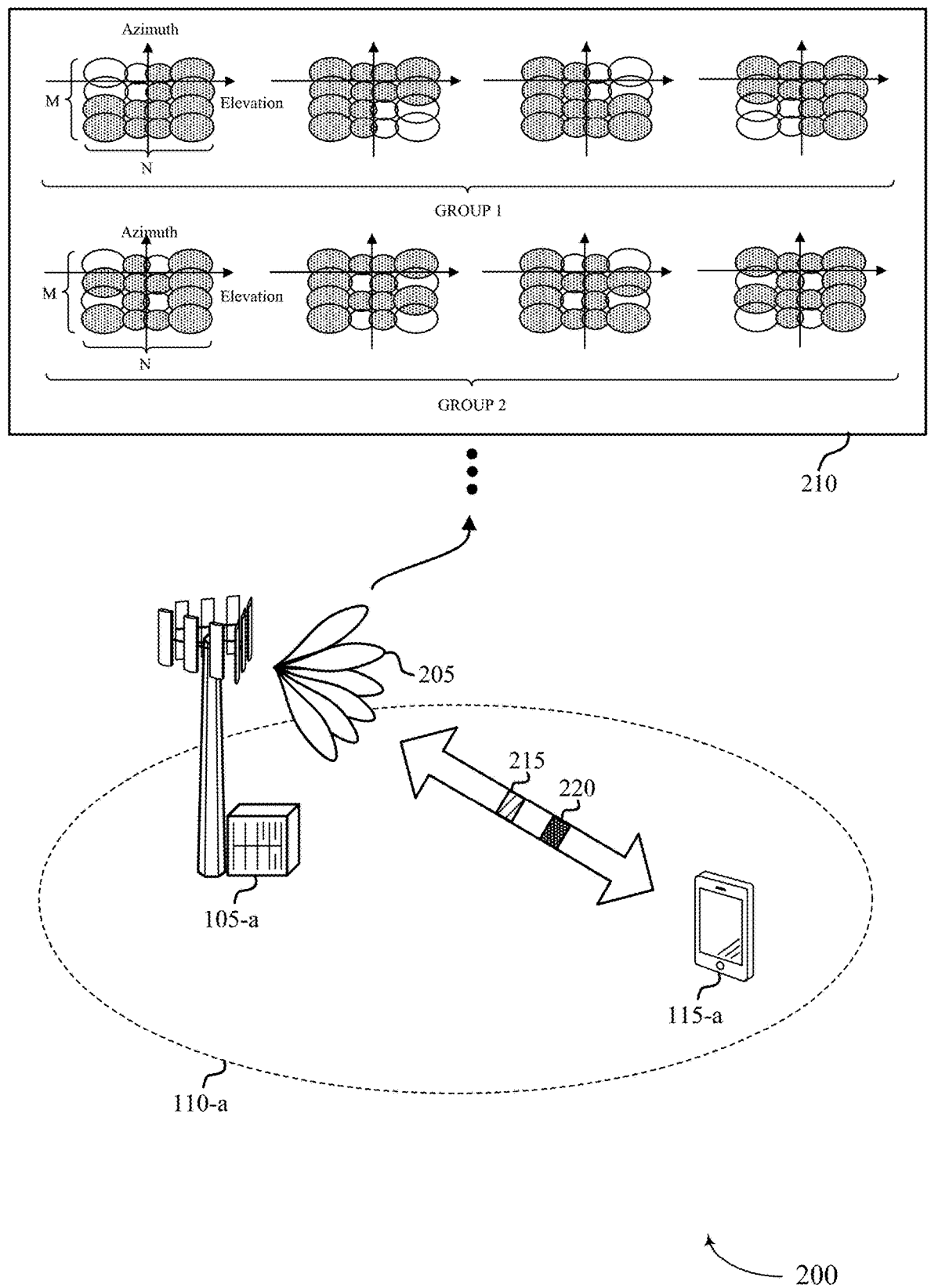

FIG. 2 illustrates an example of a wireless communications system 200 that supports reduced overhead beam sweep for initial access in accordance with aspects of the present disclosure. For example, FIG. 2 may implement communications between a base station 105-a and a UE 115-b, which may be examples of base station 105 and UE 115 described with reference to FIG. 1.

In some wireless communications systems, a transmitting wireless device and a receiving wireless device may implement a number of beam-management techniques to establish initial access and maintain ongoing communications. In some such beam-management techniques, to establish initial access with a base station 105-a, a UE 115-a may monitor a set of SSBs that the base station 105-a may transmit to the UE 115-a using a beam sweep or burst. For example, in a high frequency system (e.g., a millimeter wave system) where narrow beams are used, the base station 105-a may generate a synchronization signal burst 205 by beamforming a number of SSBs to sweep both azimuth and elevation directions or planes, and then transmits the beamformed signal over a downlink channel to the UE 115-*a*. In some examples, the devices may implement massive multiple input-multiple output (MIMO) techniques for two dimensional beam steering in both the azimuth and elevation directions. In some cases, the base station may transmit a number of SSB groups 210 (e.g., group 1 and group 2, although different numbers of groups may be possible) which may have different transmission patterns and overlap based on the groupings.

The UE 115-*a* may receive the SSBs over multiple receive beams and measure a signal strength (e.g., reference signal receive power (RSRP)) for each transmit-receive beam pair. In such cases, the UE 115-*a* may select the transmit-receive beam pair with the maximum strength to use for initial access. In some examples, each SSB may correspond to a random access channel (RACH) occasion, and the UE 115-*a* may respond during a RACH occasion corresponding to the strongest SSB. For bands utilizing high frequencies (e.g., millimeter wave frequencies), narrow beams formed in both the azimuth and elevation planes may be associated with each SSB. In such cases, the base station 105-*a* may transmit many SSBs to service the coverage area 110-*a*, which may increase overall signaling overhead and latency of UE 115-*a* in performing SSB monitoring. For example, in some cases this may create 16 total SSBs corresponding to 16 narrow beams in azimuth and elevation directions using all the antenna elements of the base station 105-*a* to create the narrow beams, although different numbers of narrow beams may be supported.

In some other examples, the base station 105-*a* may reduce the number of beams used during beam scanning, which may reduce the overall complexity and beam overhead of the initial access procedure. For example, instead of transmitting an individual narrow beam to each azimuth and elevation pair (e.g., corresponding to a sweep through a number of beams (M×N) with M being the number of azimuths and N being the number of elevations as in groupings 210), the base station 105-*a* may decrease the total number of beams by transmitting a number of wide or coarse beams corresponding to the azimuth and elevation planes (e.g., corresponding to a sweep through a number of beams (M+N)). For example, base station 105-*a* may transmit a set of beams using a subset of antenna array elements, which may correspond to wide beams in elevation and azimuth. Further, the wide beams may correspond to 8 total SSBs (e.g., 4 beams in elevation and 4 beams in azimuth).

The UE 115-*a* may perform signal strength measurements for each beam pair (e.g., one beam in azimuth and one beam in elevation) and then determine SSB indices corresponding to the strongest beams in azimuth and elevation. The UE 115-*a* may transmit the pair of SSB indices 215 and 220 to the base station 105-*a* (during a RACH occasion associated with one or more of the SSBs) to indicate a narrow beam that the base station 105-*a* may use for communicating with the UE 115-*a*. In some examples, the UE 115-*a* may map the SSB indices 215 and 220 to the same RACH occasion or to different RACH occasions. In some examples, the UE 115-*a* may indicate one SSB index 215 during a RACH occasion symbol and another SSB index 220 by a RACH occasion frequency allocation. In some other examples, one or more SSB indices may be conveyed in a RACH preamble.

Utilizing wide beam sweeps in both elevation and azimuth to indicate a pair of SSBs during one or more RACH occasions may decrease the number of beams transmitted by the base station 105-*a*, and also reduce the number of beams measured by the UE 115-*a* as compared to narrow beam sweeping procedures, where a RACH occasion indicates a beam with a maximum signal strength. In addition, the beam sweeping procedures and SSB reporting techniques described herein may provide increased accuracy and granularity for SSB reporting by UE 115-*a*.

Figure 3:
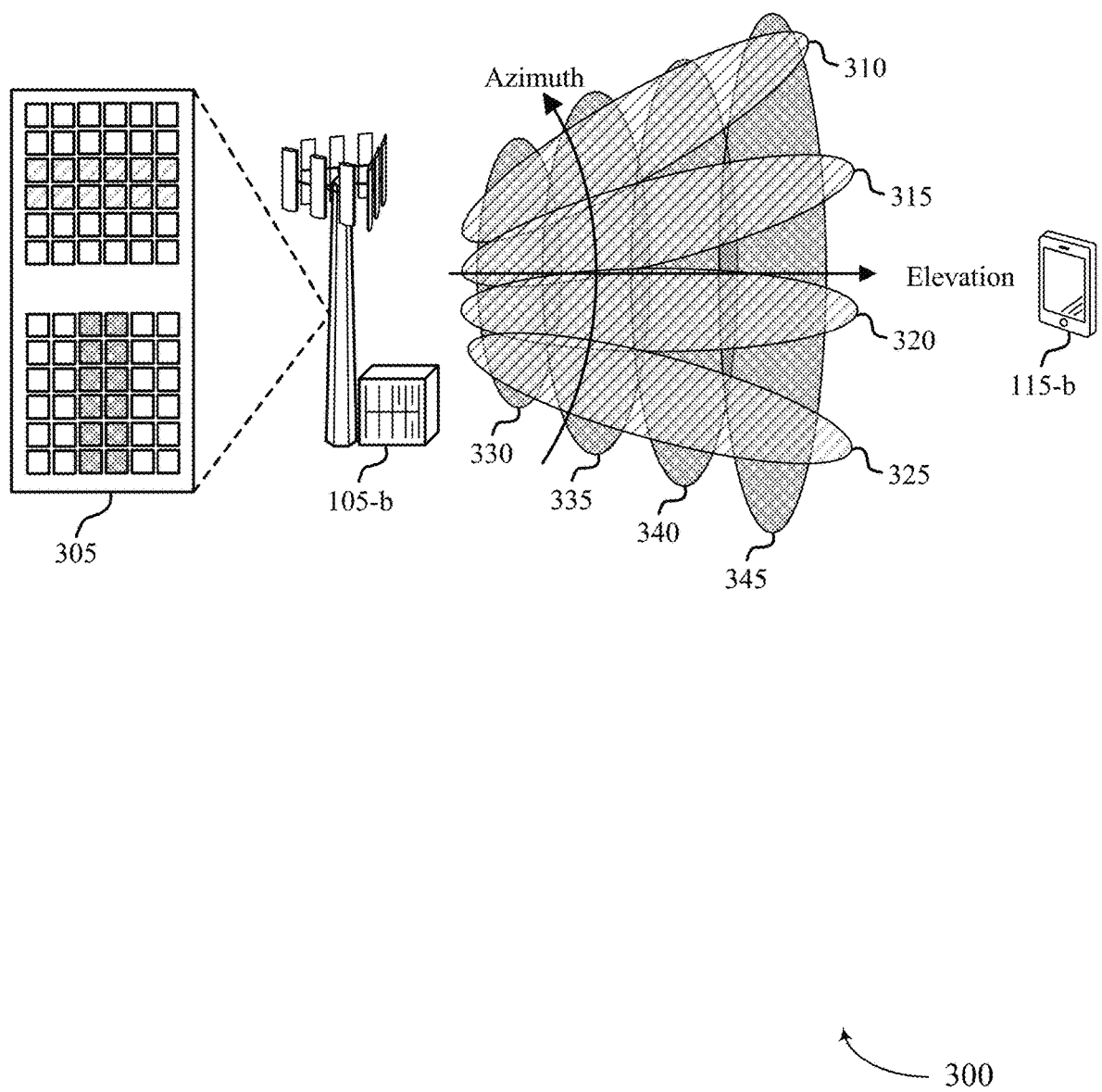
FIG. 3 illustrates an example of a beam sweeping procedure that supports reduced overhead beam sweep for initial access in accordance with aspects of the present disclosure.

FIG. 3 illustrates an example of a beam sweeping procedure 300 that supports reduced overhead beam sweep for initial access in accordance with aspects of the present disclosure. In some cases, system 300 may implement aspects of wireless communication systems 100 and 200, and may be an additional example of the process described with reference to FIG. 2. For example, the beam sweeping procedure 300 may be a beam sweeping procedure between a base station 105-*b* and a UE 115-*b*, which may be examples of corresponding devices described with reference to FIGS. 1 and 2. In addition, FIG. 3 may describe a procedure used to divide a set of beams into groups, such that a single beam is described by two or more indices, each corresponding to one group, as described with reference to FIG. 2.

The base station 105-*b* may employ techniques to reduce beam sweeping overhead by sweeping wide beams corresponding to different domains, such as azimuth and elevation. Beams may be swept which are wide in one direction and narrow in another. For example, instead of transmitting narrow beams (e.g., which are narrow in both elevation and azimuth), the base station 105-*b* may transmit beams 330 through 245 (which are narrow in azimuth and wide in elevation), and beams 310 through 325 (e.g., which are narrow in elevation and wide in azimuth). Such beams may be transmitted by the base station using one or more subsets of array elements 305, which may be used to create a wide beam in either azimuth or elevation.

In some cases, the base station 105-*b* may transmit sets of SSBs the beam sweep in a direction of the UE 115-*b*. The base station 105-*b* may generate a synchronization signal burst by beamforming a number of SSBs to sweep both azimuth and elevation directions. For example, the base station may transmit SSBs 1, 2, 3, and 4 in azimuthal directions 305, 310, 315, and 320, respectively, and then may transmit SSBs 5, 6, 7, and 8 in elevation directions 325, 330, 335, and 340, respectively. The UE 115-*b* may receive the beams 310 through 345, and may measure a signal strength or signal quality (e.g., RSRP) associated with each of the beams, and may determine a beam pair corresponding to a wide beam in elevation and a wide beam in azimuth. For example, the UE 115-*b* may select a beam pair that has the highest signal strength of all beam pairs. In some cases, the UE 115-*b* may determine an azimuth beam (e.g., corresponding to one of SSBs 1, 2, 3, or 4) corresponding to the highest signal strength of all of the azimuth beams and may determine an elevation beam (corresponding to one of SSBs 4, 6, 7, or 8) corresponding to the highest signal strength of all the elevation beams. The UE 115-*b* then may report SSB indices corresponding to the azimuth and elevation beam pair, which may correspond to a narrow beam for the base station 105-*b* to use for communicating with the UE 115-*b*.

In some examples, the base station 105-*b* may transmit a system information message (e.g., a master information block of a remaining minimum system information) to the UE 115-*b* which indicates the beam sweeping method described with reference to FIG. 3. Upon transmitting the message, the base station 105-*b* may perform the beam sweep to sweep SSBs over the azimuth and elevation directions. Upon determining the strongest beams in both azimuth and elevation, the UE 115-*b* may convey two SSB indices corresponding to the best elevation and azimuth beams during one or more RACH occasions. The UE 115-*b* may employ a number of different techniques to transmit the SSB indices to the base station 105-*b*.

In some examples, the UE 115-*b* may transmit each pair of SSBs representing azimuth and elevation in a single RACH occasion (e.g., each SSB pair may be mapped to a single RACH occasion). In some other examples, a first SSB index (e.g., corresponding to elevation) may be conveyed by a corresponding RACH occasion (e.g., the RACH occasion associated with SSBs 1, 2, 3, or 4), and the second SSB index (e.g., corresponding to elevation or azimuth) is conveyed by a second RACH occasion (e.g., a RACH occasion associated with SSBs 5, 6, 7, or 8). In this case, the different SSB indices may be mapped to different RACH occasions for transmission to the base station 105-*b*.

In some other examples, the UE 115-*b* may transmit a first SSB index in a RACH occasion symbol (e.g., using a time resource), and may transmit the second SSB in a RACH occasion frequency allocation (e.g., using a frequency resource). In another example, the UE 115-*b* may transmit a first SSB index in a RACH occasion, and may transmit the second SSB index in a corresponding RACH preamble. The base station 105-*b* may register the UE 115-*b* on a narrow beam corresponding to an azimuth and elevation pair (e.g., (elevation, azimuth)) conveyed by the UE 115-*b* via the SSB indices.

Figure 4:
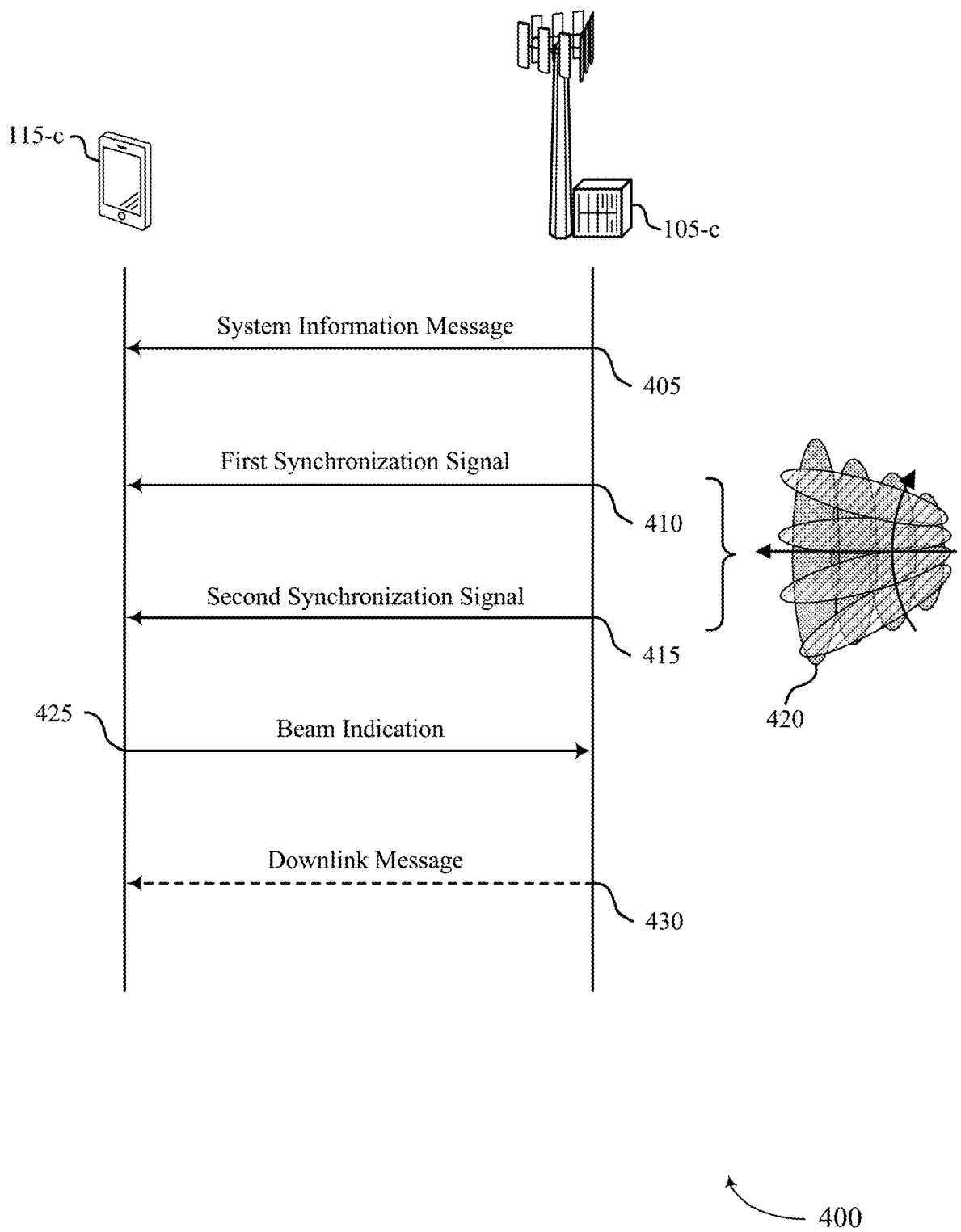
FIG. 4 illustrates an example of a process flow that supports reduced overhead beam sweep for initial access in accordance with aspects of the present disclosure.

FIG. 4 illustrates an example of a process flow 400 that supports reduced overhead beam sweep for initial access in accordance with aspects of the present disclosure. In some examples, process flow 400 may implement aspects of wireless communications systems 100 and 200, and beam sweeping procedure 300. In the following description of the process flow 400, base station 105-*c* and UE 115-*c* may perform the operations described in a different order or at different times than the exemplary order shown. In some cases, certain operations may also be left out of the process flow 400, or other operations may be added to the process flow 400.

At 405, base station 105-*c* may transmit, and UE 115-*c* may receive, a system information message which may indicate a type of beam sweeping procedure supported by the base station (e.g., a beam sweeping procedure similar to the procedure described with reference to FIG. 2). For example, in some cases the base station 105-*c* may indicate a beam sweeping procedure that includes a first beam sweep and a second beam sweep. In some such cases, a first set of synchronization signals may be transmitted using a first set of beams via the first beam sweep, and a second set of synchronization signals may be transmitted using a second set of beams via a second beam sweep. In some examples, the first set of beams may correspond to a number of elevation coordinates and the second set of beams may correspond to a number of azimuthal coordinates. In some cases, the first and second sets of synchronization signals may be mapped to respective RACH occasions.

At 410, base station 105-*c* may transmit, and the UE 115-*c* may receive, a first synchronization signal from the first set of synchronization signals as part of the beam sweeping procedure 420. In addition, at 415 the base station 105-*c* may transmit, and UE 115-*c* may receive, a second synchronization signal from the second set of synchronization signals as part of the beam sweeping procedure 420.

At 425, during one or more RACH occasions associated with the beam sweeping procedure 420, UE 115-*c* may transmit, and base station 105-*c* may receive, one or more messages indicating a beam for communications between UE 115-*c* and base station 105-*c*. In some examples, the indicated beam corresponds to both the first synchronization signal and the second synchronization signal.

In some examples, the UE 115-*c* may indicate the beam to be used for communication using a first synchronization signal index corresponding to the first synchronization signal during a first time period corresponding to the first beam sweep and a second synchronization signal index corresponding to the second synchronization signal during a second time period corresponding to the second beam sweep. UE 115-*c* may transmit the synchronization signal indices using a number of different methods. For example, in some cases the UE 115-*c* may transmit a first message with both the first and the second synchronization signal indices during a first RACH occasion.

In another example, UE 115-*c* may transmit a first message which includes the first synchronization signal index during a first RACH occasion, and a second message which includes the second synchronization signal index during a second RACH occasion. In some cases, the first RACH occasion may be different from the second RACH occasion. In some other examples, UE 115-*c* may transmit the first synchronization signal index during a RACH occasion symbol and the second synchronization signal index during a RACH occasion frequency allocation. In some other examples, UE 115-*c* may transmit the first synchronization signal index during a first RACH occasion, and the second synchronization signal index during a RACH preamble of a RACH transmission associated with one or more RACH occasions.

At 430, once the UE 115-*c* has indicated to base station 105-*c* which beam should be used for communication, base station 105-*c* may transmit a downlink message to UE 115-*c* a downlink message on the beam corresponding to both the first synchronization signal index and the second synchronization signal index.

Figure 5:
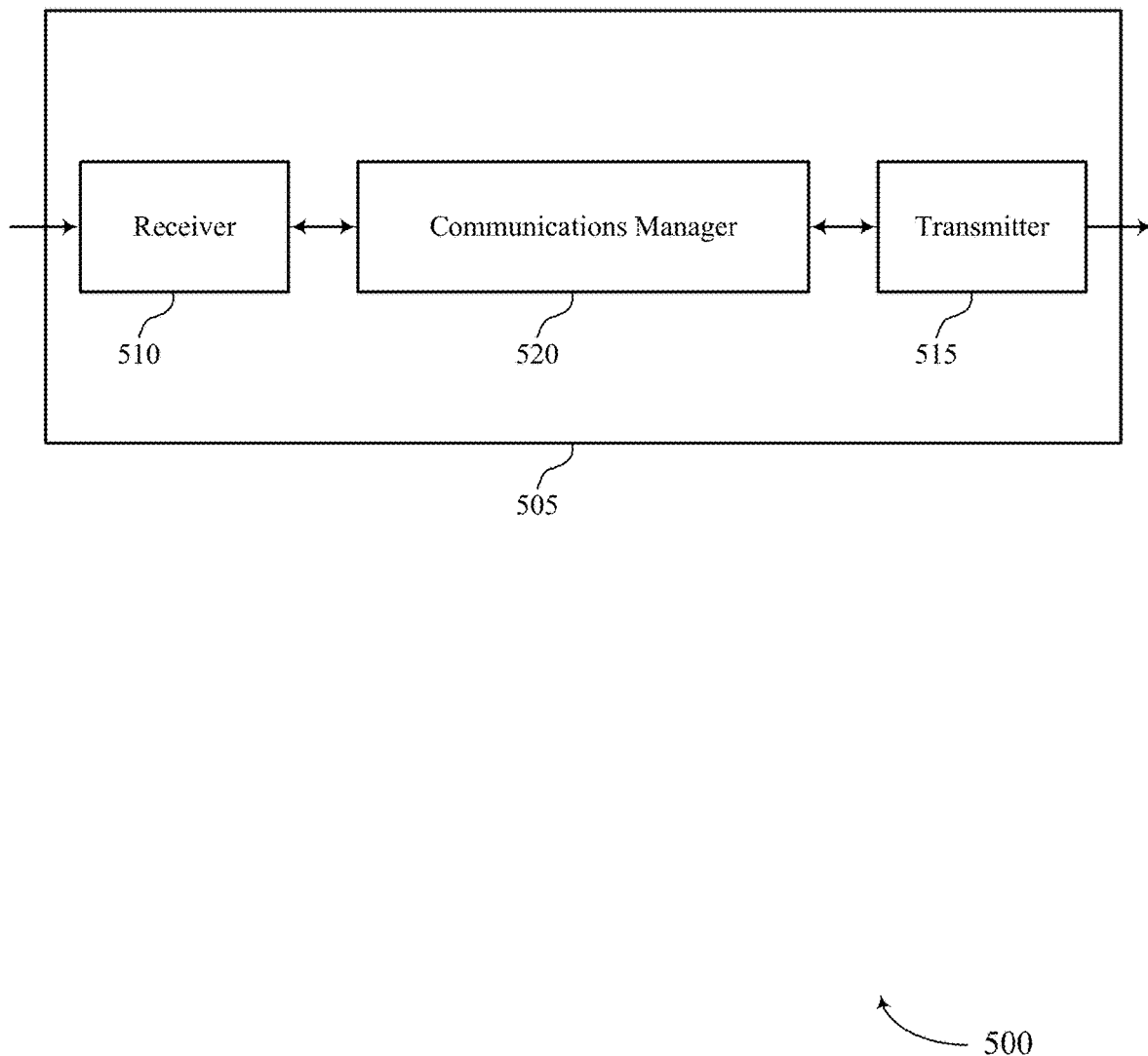
FIGS. 5 and 6 show block diagrams of devices that support reduced overhead beam sweep for initial access in accordance with aspects of the present disclosure.

FIG. 5 shows a block diagram 500 of a device 505 that supports reduced overhead beam sweep for initial access in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reduced overhead beam sweep for initial access). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reduced overhead beam sweep for initial access). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reduced overhead beam sweep for initial access as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a system information message indicating a type of a beam sweeping procedure supported by the base station. The communications manager 520 may be configured as or otherwise support a means for receiving, as part of the beam sweeping procedure, a first synchronization signal of a first set of synchronization signals of the beam sweeping procedure. The communications manager 520 may be configured as or otherwise support a means for receiving, as part of the beam sweeping procedure, a second synchronization signal of a second set of synchronization signals of the beam sweeping procedure. The communications manager 520 may be configured as or otherwise support a means for transmitting, to the base station during one or more random access occasions associated with the beam sweeping procedure, one or more messages indicating a beam for communications between the UE and the base station, the beam corresponding to both the first synchronization signal and the second synchronization signal.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing related to reduced beam measurements, reduced power consumption, more efficient utilization of communication resources.

Figure 6:
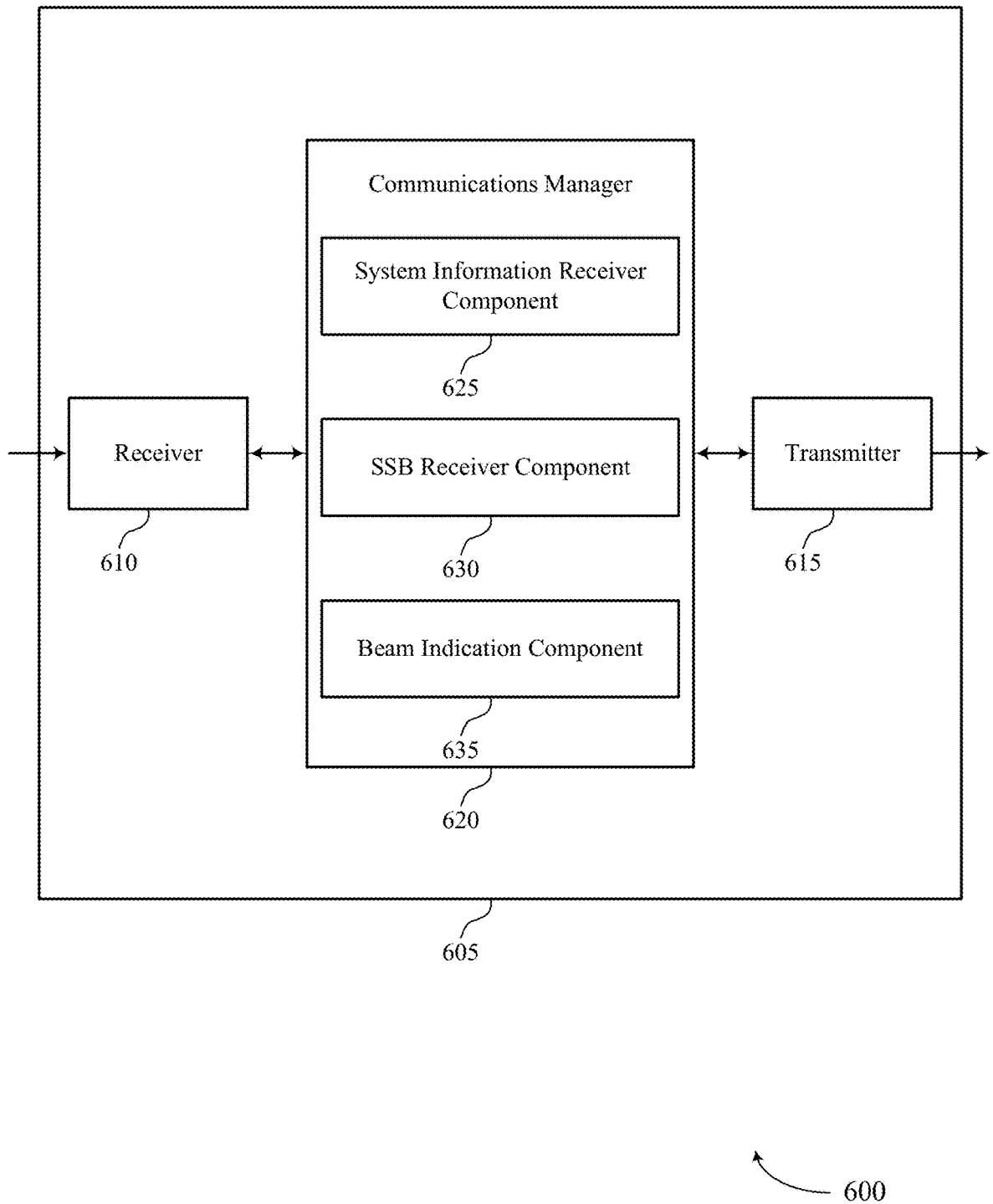

FIG. 6 shows a block diagram 600 of a device 605 that supports reduced overhead beam sweep for initial access in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reduced overhead beam sweep for initial access). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reduced overhead beam sweep for initial access). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reduced overhead beam sweep for initial access as described herein. For example, the communications manager 620 may include a system information receiver component 625, an SSB receiver component 630, a beam indication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The system information receiver component 625 may be configured as or otherwise support a means for receiving, from a base station, a system information message indicating a type of a beam sweeping procedure supported by the base station. The SSB receiver component 630 may be configured as or otherwise support a means for receiving, as part of the beam sweeping procedure, a first synchronization signal of a first set of synchronization signals of the beam sweeping procedure. The SSB receiver component 630 may be configured as or otherwise support a means for receiving, as part of the beam sweeping procedure, a second synchronization signal of a second set of synchronization signals of the beam sweeping procedure. The beam indication component 635 may be configured as or otherwise support a means for transmitting, to the base station during one or more random access occasions associated with the beam sweeping procedure, one or more messages indicating a beam for communications between the UE and the base station, the beam corresponding to both the first synchronization signal and the second synchronization signal.

Figure 7:
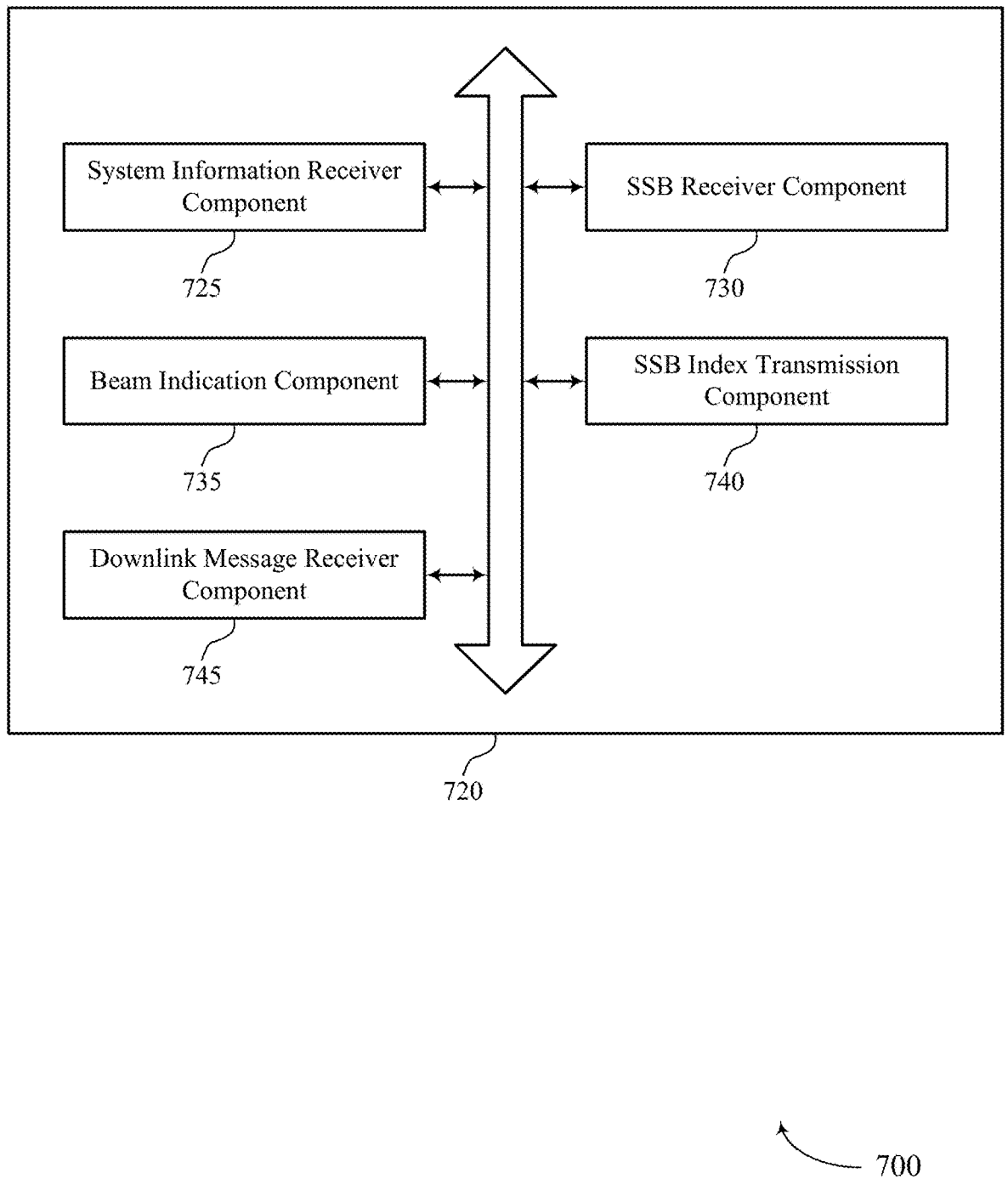
FIG. 7 shows a block diagram of a communications manager that supports reduced overhead beam sweep for initial access in accordance with aspects of the present disclosure.

FIG. 7 shows a block diagram 700 of a communications manager 720 that supports reduced overhead beam sweep for initial access in accordance with aspects of the present disclosure. The communications manager 720 may be an example of aspects of a communications manager 520, a communications manager 620, or both, as described herein. The communications manager 720, or various components thereof, may be an example of means for performing various aspects of reduced overhead beam sweep for initial access as described herein. For example, the communications manager 720 may include a system information receiver component 725, an SSB receiver component 730, a beam indication component 735, an SSB index transmission component 740, a downlink message receiver component 745, or any combination thereof. Each of these components may communicate, directly or indirectly, with one another (e.g., via one or more buses).

The communications manager 720 may support wireless communications at a UE in accordance with examples as disclosed herein. The system information receiver component 725 may be configured as or otherwise support a means for receiving, from a base station, a system information message indicating a type of a beam sweeping procedure supported by the base station. The SSB receiver component 730 may be configured as or otherwise support a means for receiving, as part of the beam sweeping procedure, a first synchronization signal of a first set of synchronization signals of the beam sweeping procedure. In some examples, the SSB receiver component 730 may be configured as or otherwise support a means for receiving, as part of the beam sweeping procedure, a second synchronization signal of a second set of synchronization signals of the beam sweeping procedure. The beam indication component 735 may be configured as or otherwise support a means for transmitting, to the base station during one or more random access occasions associated with the beam sweeping procedure, one or more messages indicating a beam for communications between the UE and the base station, the beam corresponding to both the first synchronization signal and the second synchronization signal.

In some examples, the SSB index transmission component 740 may be configured as or otherwise support a means for transmitting, to the base station during a first random access occasion, a first message including a first synchronization signal index corresponding to the first synchronization signal and a second synchronization signal index corresponding to the second synchronization signal.

In some examples, the SSB index transmission component 740 may be configured as or otherwise support a means for transmitting, to the base station in a first random access occasion, a first message including a first synchronization signal index corresponding to the first synchronization signal. In some examples, the SSB index transmission component 740 may be configured as or otherwise support a means for transmitting, to the base station in a second random access occasion, a second message including a second synchronization signal index corresponding to the second synchronization signal.

In some examples, the first random access occasion is different from the second random access occasion.

In some examples, the beam sweeping procedure includes a first beam sweep and a second beam sweep, and the SSB receiver component 730 may be configured as or otherwise support a means for receiving the first set of synchronization signals during the first beam sweep according to a set of multiple elevation coordinates. In some examples, the beam sweeping procedure includes a first beam sweep and a second beam sweep, and the SSB receiver component 730 may be configured as or otherwise support a means for receiving the second set of synchronization signals during the second beam sweep according to a set of multiple azimuthal coordinates.

In some examples, the SSB index transmission component 740 may be configured as or otherwise support a means for transmitting a first synchronization signal index corresponding to the first synchronization signal during a first time period corresponding to the first beam sweep. In some examples, the SSB index transmission component 740 may be configured as or otherwise support a means for transmitting a second synchronization signal index corresponding to the second synchronization signal during a second time period corresponding to the second beam sweep.

In some examples, the SSB index transmission component 740 may be configured as or otherwise support a means for transmitting, to the base station, a first synchronization signal index corresponding to the first synchronization signal during a random access occasion symbol. In some examples, the SSB index transmission component 740 may be configured as or otherwise support a means for transmitting, to the base station, a second synchronization signal index corresponding to the second synchronization signal during a random access occasion frequency allocation.

In some examples, the SSB index transmission component 740 may be configured as or otherwise support a means for transmitting, to the base station, a first synchronization signal index corresponding to the first synchronization signal during a first random access occasion. In some examples, the SSB index transmission component 740 may be configured as or otherwise support a means for transmitting, to the base station, a second synchronization signal index corresponding to the second synchronization signal in a random access preamble of a random access transmission associated with the one or more random access occasions.

In some examples, the first set of synchronization signals are associated with a set of multiple elevation coordinates and the second set of synchronization signals are associated with a set of multiple azimuthal coordinates.

In some examples, the downlink message receiver component 745 may be configured as or otherwise support a means for receiving, from the base station, a downlink message on the beam corresponding to both the first synchronization signal and the second synchronization signal based on the beam sweeping procedure.

In some examples, the first set of synchronization signals and the second set of synchronization signals are mapped to respective random access occasions of the one or more random access occasions based on the beam sweeping procedure.

Figure 8:
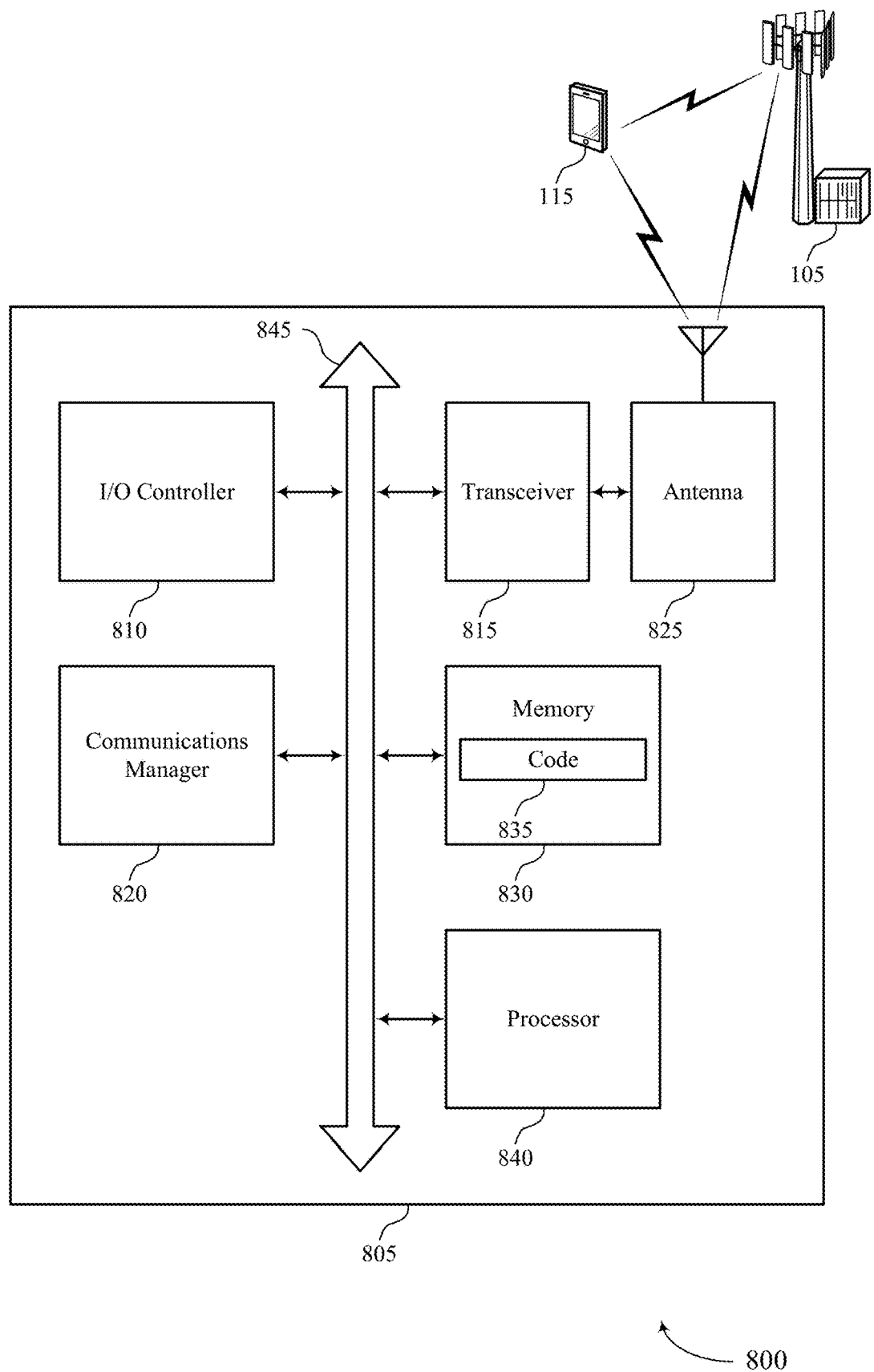
FIG. 8 shows a diagram of a system including a device that supports reduced overhead beam sweep for initial access in accordance with aspects of the present disclosure.

FIG. 8 shows a diagram of a system 800 including a device 805 that supports reduced overhead beam sweep for initial access in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reduced overhead beam sweep for initial access). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a system information message indicating a type of a beam sweeping procedure supported by the base station. The communications manager 820 may be configured as or otherwise support a means for receiving, as part of the beam sweeping procedure, a first synchronization signal of a first set of synchronization signals of the beam sweeping procedure. The communications manager 820 may be configured as or otherwise support a means for receiving, as part of the beam sweeping procedure, a second synchronization signal of a second set of synchronization signals of the beam sweeping procedure. The communications manager 820 may be configured as or otherwise support a means for transmitting, to the base station during one or more random access occasions associated with the beam sweeping procedure, one or more messages indicating a beam for communications between the UE and the base station, the beam corresponding to both the first synchronization signal and the second synchronization signal.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, reduced beam sweeping overhead (e.g., reduced signaling overhead), reduced beam measurements performed, and increased beam selection efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reduced overhead beam sweep for initial access as described herein, or the processor 840 and the memory 830 may be otherwise configured to perform or support such operations.

Figure 9:
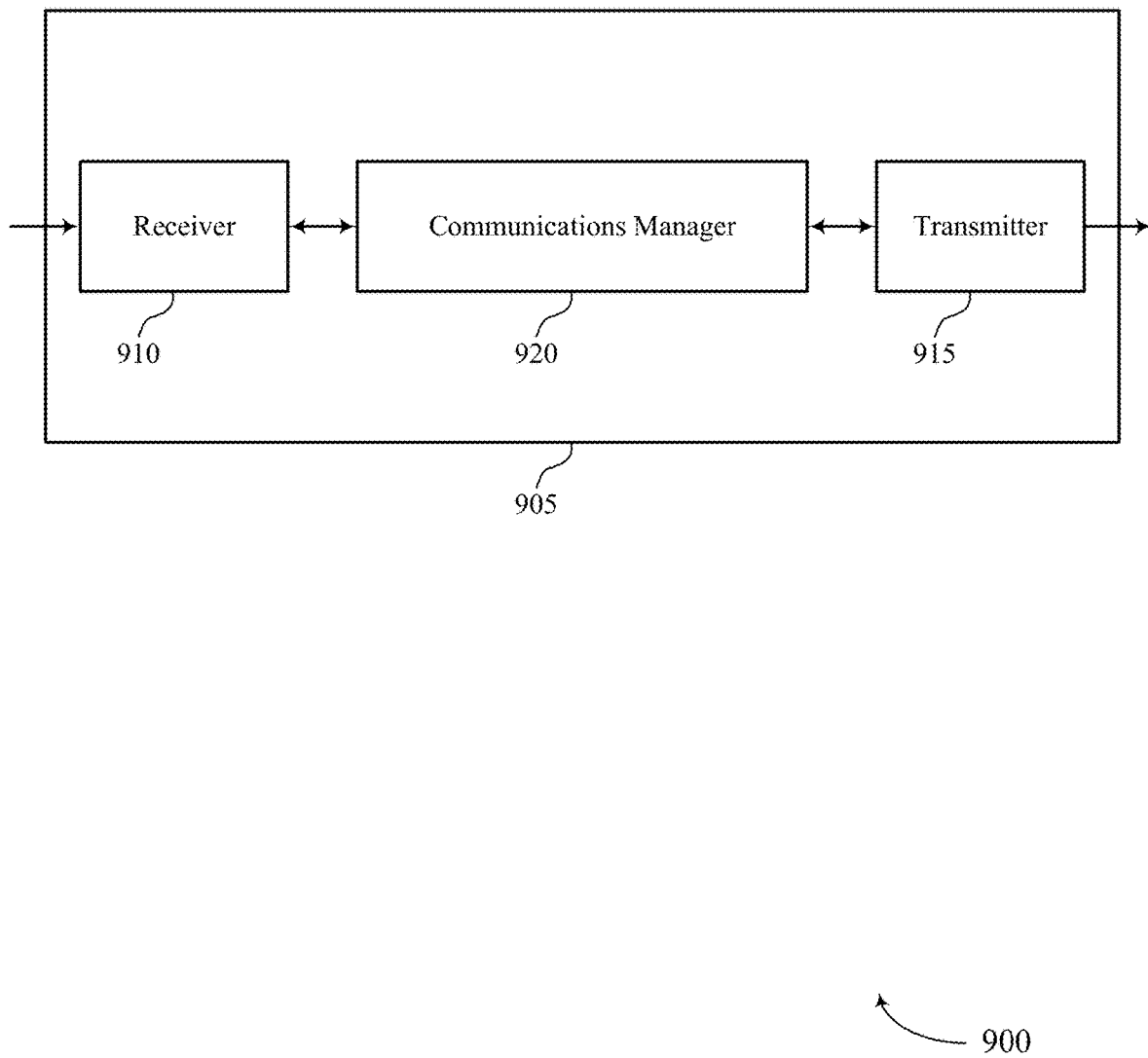
FIGS. 9 and 10 show block diagrams of devices that support reduced overhead beam sweep for initial access in accordance with aspects of the present disclosure.

FIG. 9 shows a block diagram 900 of a device 905 that supports reduced overhead beam sweep for initial access in accordance with aspects of the present disclosure. The device 905 may be an example of aspects of a base station 105 as described herein. The device 905 may include a receiver 910, a transmitter 915, and a communications manager 920. The device 905 may also include a processor.

Each of these components may be in communication with one another (e.g., via one or more buses).

The receiver 910 may provide a means for receiving information such as packets, user data, control information, or any combination thereof associated with various information channels (e.g., control channels, data channels, information channels related to reduced overhead beam sweep for initial access). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reduced overhead beam sweep for initial access). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of reduced overhead beam sweep for initial access as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a system information message indicating a type of a beam sweeping procedure supported by the base station. The communications manager 920 may be configured as or otherwise support a means for transmitting, as part of the beam sweeping procedure, a first synchronization signal of a first set of synchronization signals of the beam sweeping procedure. The communications manager 920 may be configured as or otherwise support a means for transmitting, as part of the beam sweeping procedure, a second synchronization signal of a second set of synchronization signals of the beam sweeping procedure. The communications manager 920 may be configured as or otherwise support a means for receiving, from the UE during one or more random access occasions associated with the beam sweeping procedure, one or more messages indicating a beam for communications between the UE and the base station, the beam corresponding to both the first synchronization signal and the second synchronization signal.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing related to reduced beam transmission, reduced power consumption, and more efficient utilization of communication resources.

Figure 10:
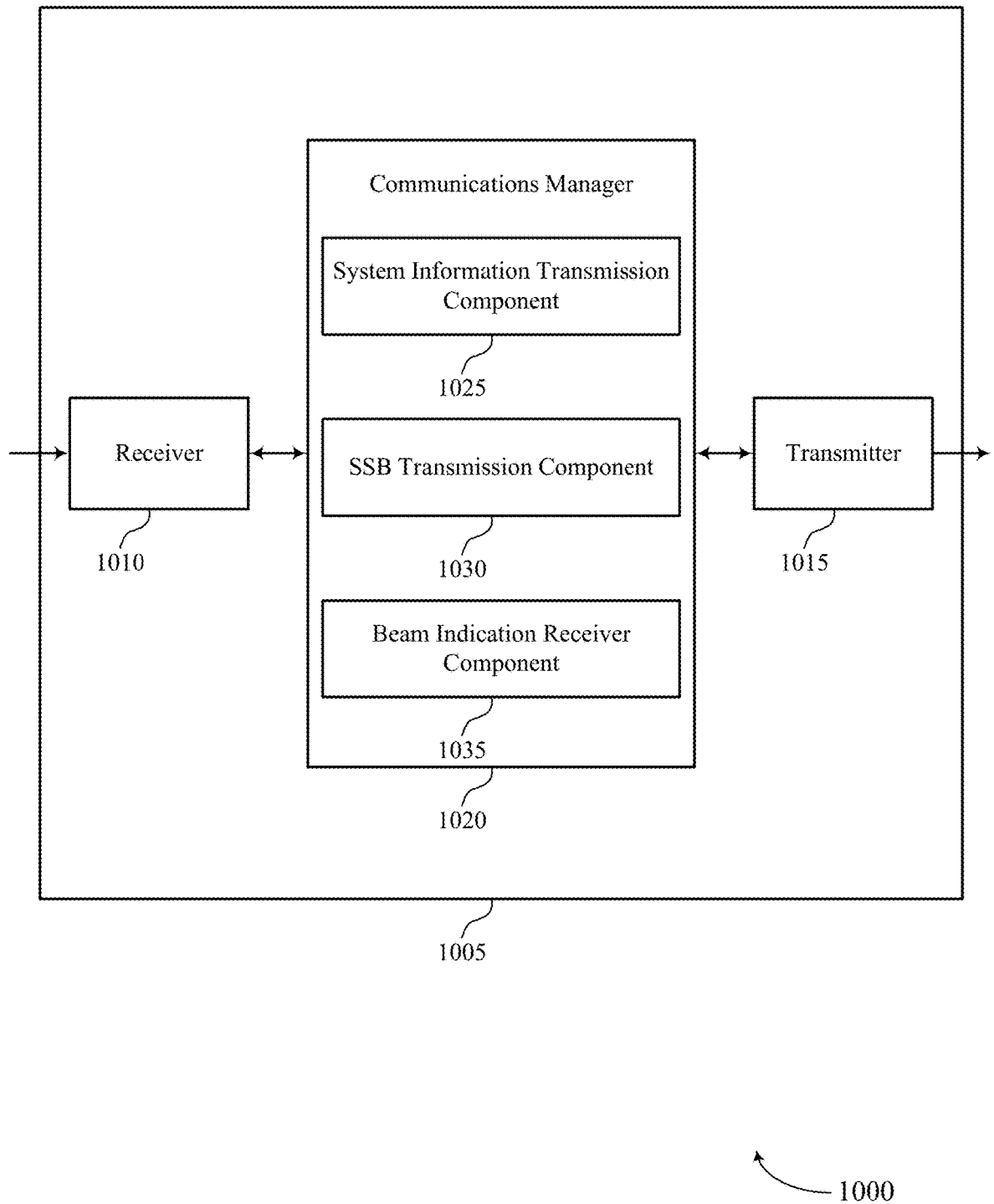

FIG. 10 shows a block diagram 1000 of a device 1005 that supports reduced overhead beam sweep for initial access in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reduced overhead beam sweep for initial access). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reduced overhead beam sweep for initial access). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of reduced overhead beam sweep for initial access as described herein. For example, the communications manager 1020 may include a system information transmission component 1025, an SSB transmission component 1030, a beam indication receiver component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The system information transmission component 1025 may be configured as or otherwise support a means for transmitting, to a UE, a system information message indicating a type of a beam sweeping procedure supported by the base station. The SSB transmission component 1030 may be configured as or otherwise support a means for transmitting, as part of the beam sweeping procedure, a first synchronization signal of a first set of synchronization signals of the beam sweeping procedure. The SSB transmission component 1030 may be configured as or otherwise support a means for transmitting, as part of the beam sweeping procedure, a second synchronization signal of a second set of synchronization signals of the beam sweeping procedure. The beam indication receiver component 1035 may be configured as or otherwise support a means for receiving, from the UE during one or more random access occasions associated with the beam sweeping procedure, one or more messages indicating a beam for communications between the UE and the base station, the beam corresponding to both the first synchronization signal and the second synchronization signal.

Figure 11:
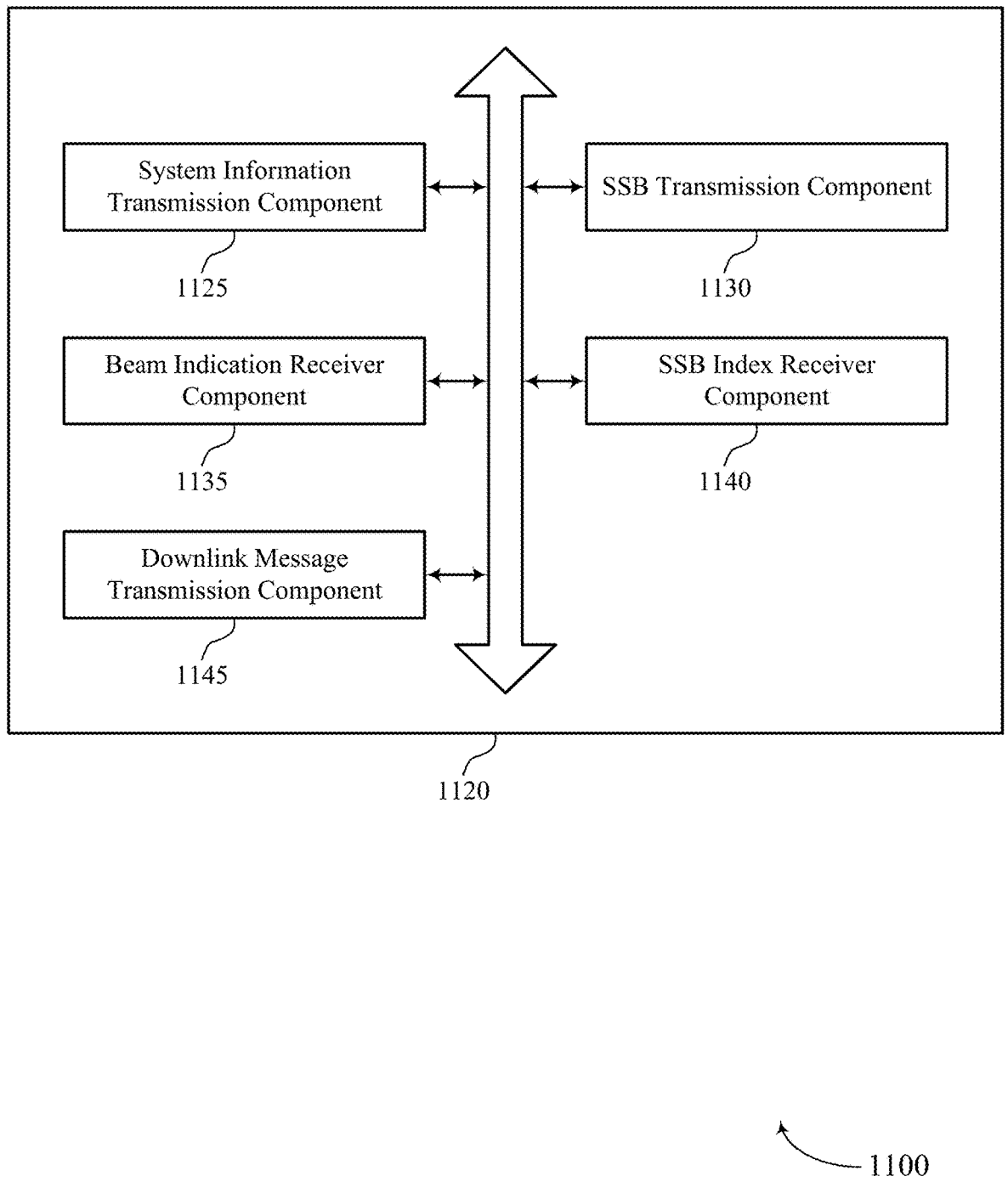
FIG. 11 shows a block diagram of a communications manager that supports reduced overhead beam sweep for initial access in accordance with aspects of the present disclosure.

FIG. 11 shows a block diagram 1100 of a communications manager 1120 that supports reduced overhead beam sweep for initial access in accordance with aspects of the present disclosure. The communications manager 1120 may be an example of aspects of a communications manager 920, a communications manager 1020, or both, as described herein. The communications manager 1120, or various components thereof, may be an example of means for performing various aspects of reduced overhead beam sweep for initial access as described herein. For example, the communications manager 1120 may include a system information transmission component 1125, an SSB transmission component 1130, a beam indication receiver component 1135, an SSB index receiver component 1140, a downlink message transmission component 1145, or any combination thereof. Each of these components may communicate, directly or indirectly, with one another (e.g., via one or more buses).

The communications manager 1120 may support wireless communications at a base station in accordance with examples as disclosed herein. The system information transmission component 1125 may be configured as or otherwise support a means for transmitting, to a UE, a system information message indicating a type of a beam sweeping procedure supported by the base station. The SSB transmission component 1130 may be configured as or otherwise support a means for transmitting, as part of the beam sweeping procedure, a first synchronization signal of a first set of synchronization signals of the beam sweeping procedure. In some examples, the SSB transmission component 1130 may be configured as or otherwise support a means for transmitting, as part of the beam sweeping procedure, a second synchronization signal of a second set of synchronization signals of the beam sweeping procedure. The beam indication receiver component 1135 may be configured as or otherwise support a means for receiving, from the UE during one or more random access occasions associated with the beam sweeping procedure, one or more messages indicating a beam for communications between the UE and the base station, the beam corresponding to both the first synchronization signal and the second synchronization signal.

In some examples, the SSB index receiver component 1140 may be configured as or otherwise support a means for receiving, from the UE during a first random access occasion, a first message including a first synchronization signal index corresponding to the first synchronization signal and a second synchronization signal index corresponding to the second synchronization signal.

In some examples, the SSB index receiver component 1140 may be configured as or otherwise support a means for receiving, from the UE in a first random access occasion, a first message including a first synchronization signal index corresponding to the first synchronization signal. In some examples, the SSB index receiver component 1140 may be configured as or otherwise support a means for receiving, from the UE in a second random access occasion, a second message including a second synchronization signal index corresponding to the second synchronization signal.

In some examples, the first random access occasion is different from the second random access occasion.

In some examples, the beam sweeping procedure includes a first beam sweep and a second beam sweep, and the SSB transmission component 1130 may be configured as or otherwise support a means for transmitting, to the UE, the first set of synchronization signals during the first beam sweep according to a set of multiple elevation coordinates. In some examples, the beam sweeping procedure includes a first beam sweep and a second beam sweep, and the SSB transmission component 1130 may be configured as or otherwise support a means for transmitting, to the UE, the second set of synchronization signals during the second beam sweep according to a set of multiple azimuthal coordinates.

In some examples, the SSB index receiver component 1140 may be configured as or otherwise support a means for receiving a first synchronization signal index corresponding to the first synchronization signal during a first time period corresponding to the first beam sweep. In some examples, the SSB index receiver component 1140 may be configured as or otherwise support a means for receiving a second synchronization signal index corresponding to the second synchronization signal during a second time period corresponding to the second beam sweep.

In some examples, the SSB index receiver component 1140 may be configured as or otherwise support a means for receiving, from the UE, a first synchronization signal index corresponding to the first synchronization signal during a random access occasion symbol. In some examples, the SSB index receiver component 1140 may be configured as or otherwise support a means for transmitting, to the UE, a second synchronization signal index corresponding to the second synchronization signal during a random access occasion frequency allocation.

In some examples, the SSB index receiver component 1140 may be configured as or otherwise support a means for receiving, from the UE, a first synchronization signal index corresponding to the first synchronization signal during a first random access occasion. In some examples, the SSB index receiver component 1140 may be configured as or otherwise support a means for receiving, from the UE, a second synchronization signal index corresponding to the second synchronization signal in a random access preamble of a random access transmission associated with the one or more random access occasions.

In some examples, the first set of synchronization signals are associated with a set of multiple elevation coordinates and the second set of synchronization signals are associated with a set of multiple azimuthal coordinates.

In some examples, the downlink message transmission component 1145 may be configured as or otherwise support a means for transmitting, to the UE, a downlink message on the beam corresponding to both the first synchronization signal and the second synchronization signal based on the beam sweeping procedure.

In some examples, the first set of synchronization signals and the second set of synchronization signals are mapped to respective random access occasions of the one or more random access occasions based on the beam sweeping procedure.

Figure 12:
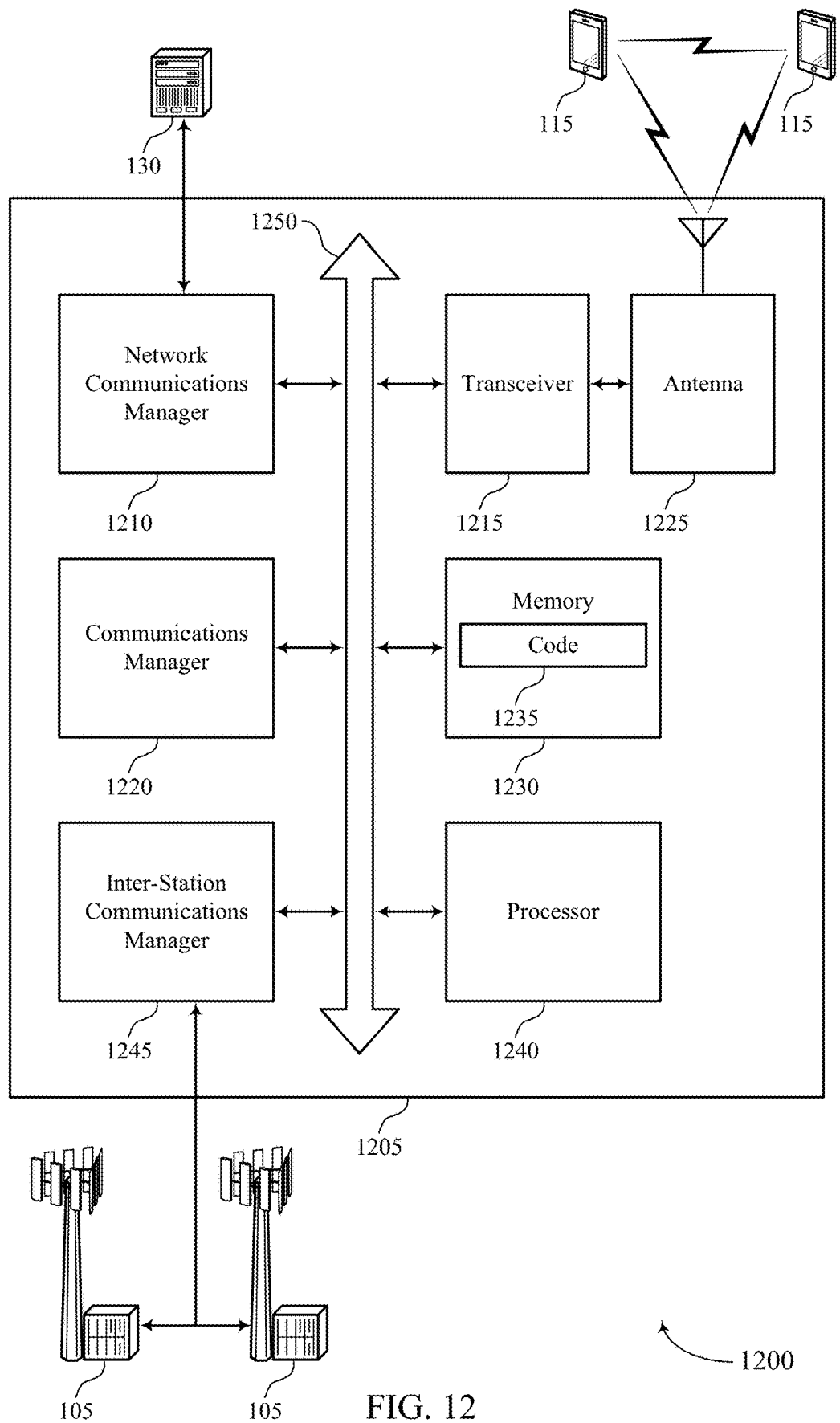
FIG. 12 shows a diagram of a system including a device that supports reduced overhead beam sweep for initial access in accordance with aspects of the present disclosure.

FIG. 12 shows a diagram of a system 1200 including a device 1205 that supports reduced overhead beam sweep for initial access in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting reduced overhead beam sweep for initial access). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a system information message indicating a type of a beam sweeping procedure supported by the base station. The communications manager 1220 may be configured as or otherwise support a means for transmitting, as part of the beam sweeping procedure, a first synchronization signal of a first set of synchronization signals of the beam sweeping procedure. The communications manager 1220 may be configured as or otherwise support a means for transmitting, as part of the beam sweeping procedure, a second synchronization signal of a second set of synchronization signals of the beam sweeping procedure. The communications manager 1220 may be configured as or otherwise support a means for receiving, from the UE during one or more random access occasions associated with the beam sweeping procedure, one or more messages indicating a beam for communications between the UE and the base station, the beam corresponding to both the first synchronization signal and the second synchronization signal.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, reduced beam sweeping overhead, reduced beam measurements performed, and increased beam selection efficiency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of reduced overhead beam sweep for initial access as described herein, or the processor 1240 and the memory 1230 may be otherwise configured to perform or support such operations.

Figure 13:
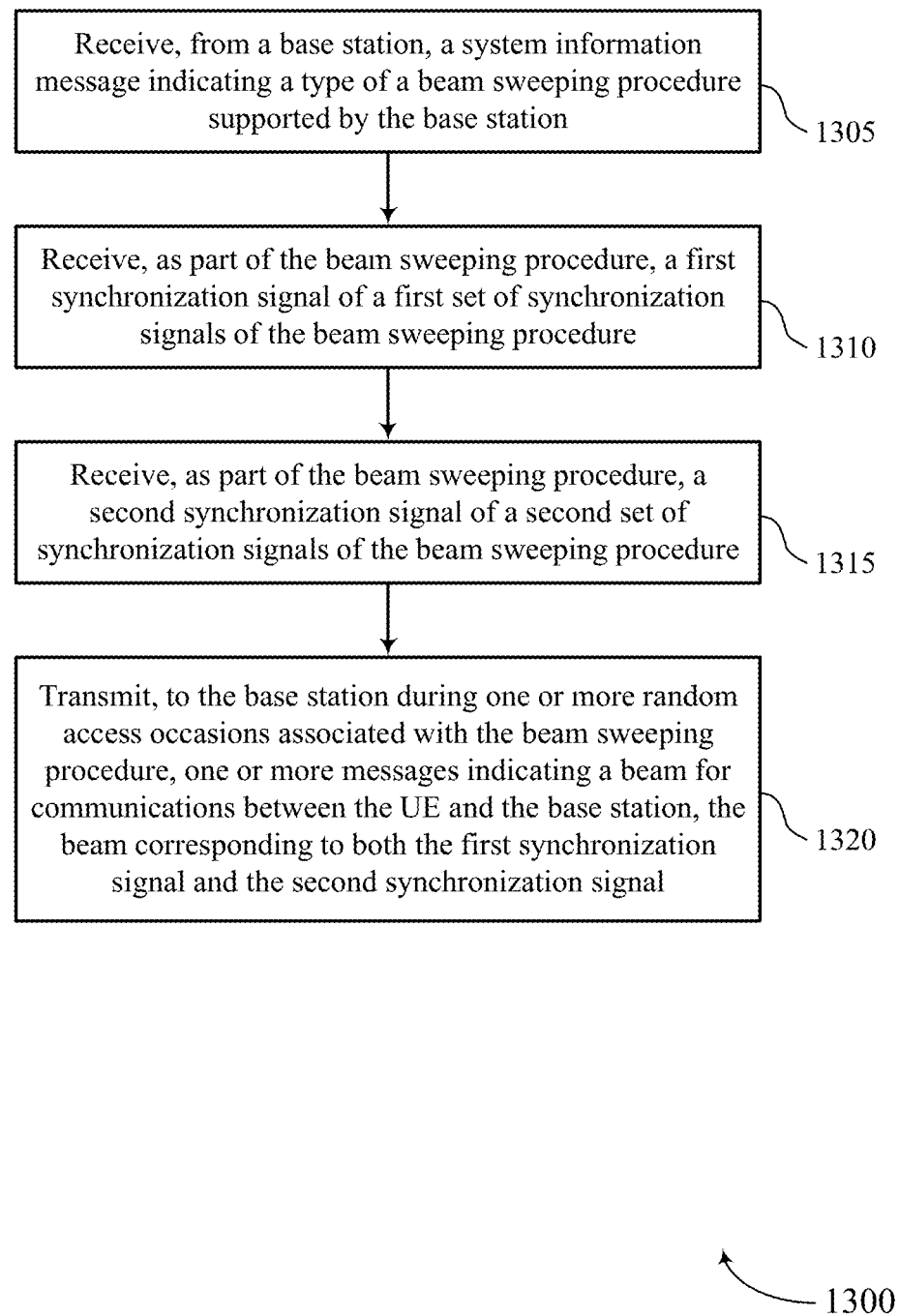
FIGS. 13 through 18 show flowcharts illustrating methods that support reduced overhead beam sweep for initial access in accordance with aspects of the present disclosure.

FIG. 13 shows a flowchart illustrating a method 1300 that supports reduced overhead beam sweep for initial access in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a system information message indicating a type of a beam sweeping procedure supported by the base station. The operations of 1305 may be performed in accordance with examples as disclosed herein. In some examples, aspects of the operations of 1305 may be performed by a system information receiver component 725 as described with reference to FIG. 7.

At 1310, the method may include receiving, as part of the beam sweeping procedure, a first synchronization signal of a first set of synchronization signals of the beam sweeping procedure. The operations of 1310 may be performed in accordance with examples as disclosed herein. In some examples, aspects of the operations of 1310 may be performed by an SSB receiver component 730 as described with reference to FIG. 7.

At 1315, the method may include receiving, as part of the beam sweeping procedure, a second synchronization signal of a second set of synchronization signals of the beam sweeping procedure. The operations of 1315 may be performed in accordance with examples as disclosed herein. In some examples, aspects of the operations of 1315 may be performed by an SSB receiver component 730 as described with reference to FIG. 7.

At 1320, the method may include transmitting, to the base station during one or more random access occasions associated with the beam sweeping procedure, one or more messages indicating a beam for communications between the UE and the base station, the beam corresponding to both the first synchronization signal and the second synchronization signal. The operations of 1320 may be performed in accordance with examples as disclosed herein. In some examples, aspects of the operations of 1320 may be performed by a beam indication component 735 as described with reference to FIG. 7.

Figure 14:
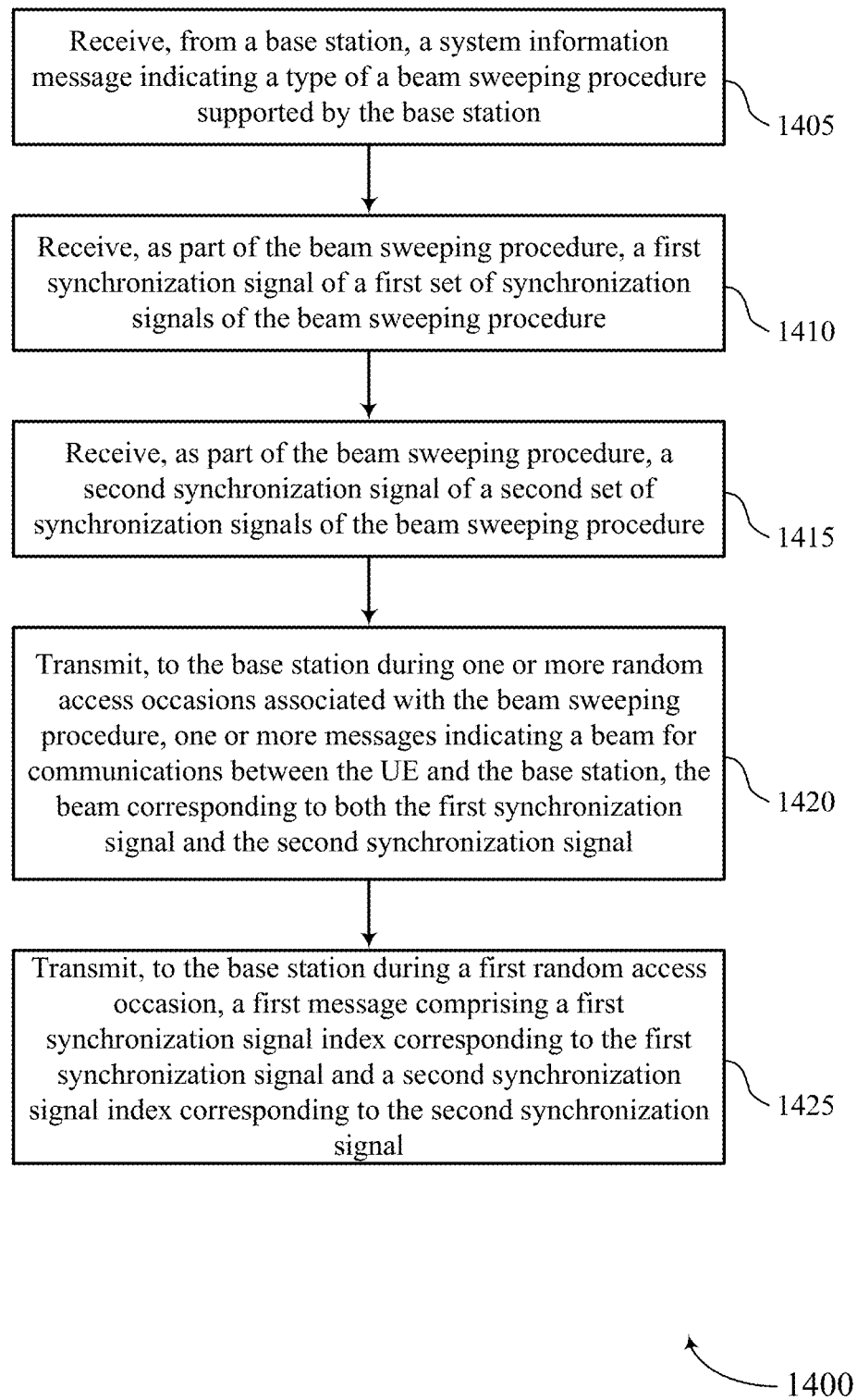

FIG. 14 shows a flowchart illustrating a method 1400 that supports reduced overhead beam sweep for initial access in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a system information message indicating a type of a beam sweeping procedure supported by the base station. The operations of 1405 may be performed in accordance with examples as disclosed herein. In some examples, aspects of the operations of 1405 may be performed by a system information receiver component 725 as described with reference to FIG. 7.

At 1410, the method may include receiving, as part of the beam sweeping procedure, a first synchronization signal of a first set of synchronization signals of the beam sweeping procedure. The operations of 1410 may be performed in accordance with examples as disclosed herein. In some examples, aspects of the operations of 1410 may be performed by an SSB receiver component 730 as described with reference to FIG. 7.

At 1415, the method may include receiving, as part of the beam sweeping procedure, a second synchronization signal of a second set of synchronization signals of the beam sweeping procedure. The operations of 1415 may be performed in accordance with examples as disclosed herein. In some examples, aspects of the operations of 1415 may be performed by an SSB receiver component 730 as described with reference to FIG. 7.

At 1420, the method may include transmitting, to the base station during one or more random access occasions associated with the beam sweeping procedure, one or more messages indicating a beam for communications between the UE and the base station, the beam corresponding to both the first synchronization signal and the second synchronization signal. The operations of 1420 may be performed in accordance with examples as disclosed herein. In some examples, aspects of the operations of 1420 may be performed by a beam indication component 735 as described with reference to FIG. 7.

At 1425, the method may include transmitting, to the base station during a first random access occasion, a first message including a first synchronization signal index corresponding to the first synchronization signal and a second synchronization signal index corresponding to the second synchronization signal. The operations of 1425 may be performed in accordance with examples as disclosed herein. In some examples, aspects of the operations of 1425 may be performed by an SSB index transmission component 740 as described with reference to FIG. 7.

Figure 15:
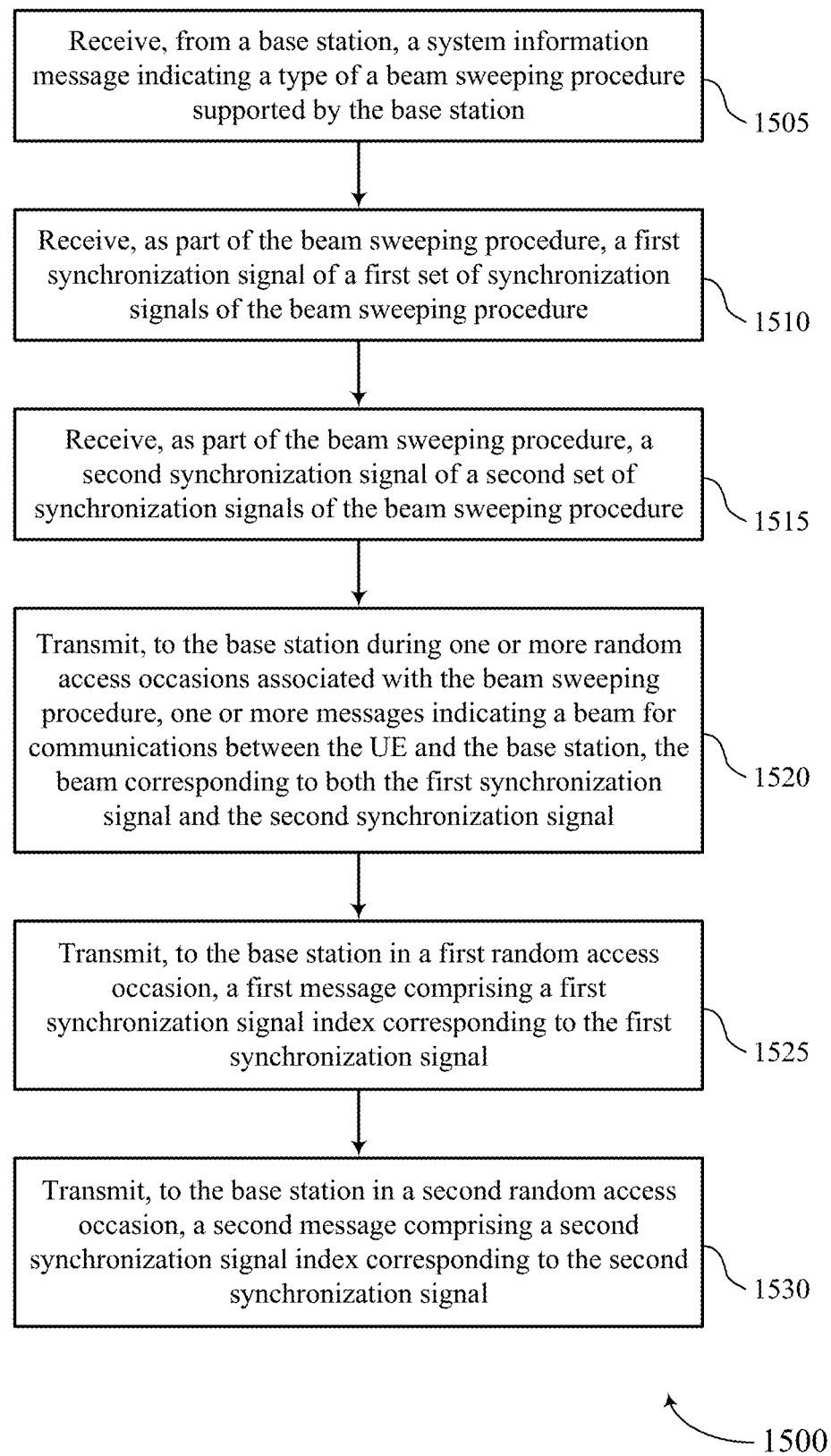

FIG. 15 shows a flowchart illustrating a method 1500 that supports reduced overhead beam sweep for initial access in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a system information message indicating a type of a beam sweeping procedure supported by the base station. The operations of 1505 may be performed in accordance with examples as disclosed herein. In some examples, aspects of the operations of 1505 may be performed by a system information receiver component 725 as described with reference to FIG. 7.

At 1510, the method may include receiving, as part of the beam sweeping procedure, a first synchronization signal of a first set of synchronization signals of the beam sweeping procedure. The operations of 1510 may be performed in accordance with examples as disclosed herein. In some examples, aspects of the operations of 1510 may be performed by an SSB receiver component 730 as described with reference to FIG. 7.

At 1515, the method may include receiving, as part of the beam sweeping procedure, a second synchronization signal of a second set of synchronization signals of the beam sweeping procedure. The operations of 1515 may be performed in accordance with examples as disclosed herein. In some examples, aspects of the operations of 1515 may be performed by an SSB receiver component 730 as described with reference to FIG. 7.

At 1520, the method may include transmitting, to the base station during one or more random access occasions associated with the beam sweeping procedure, one or more messages indicating a beam for communications between the UE and the base station, the beam corresponding to both the first synchronization signal and the second synchronization signal. The operations of 1520 may be performed in accordance with examples as disclosed herein. In some examples, aspects of the operations of 1520 may be performed by a beam indication component 735 as described with reference to FIG. 7.

At 1525, the method may include transmitting, to the base station in a first random access occasion, a first message including a first synchronization signal index corresponding to the first synchronization signal. The operations of 1525 may be performed in accordance with examples as disclosed herein. In some examples, aspects of the operations of 1525 may be performed by an SSB index transmission component 740 as described with reference to FIG. 7.

At 1530, the method may include transmitting, to the base station in a second random access occasion, a second message including a second synchronization signal index corresponding to the second synchronization signal. The operations of 1530 may be performed in accordance with examples as disclosed herein. In some examples, aspects of the operations of 1530 may be performed by an SSB index transmission component 740 as described with reference to FIG. 7.

Figure 16:
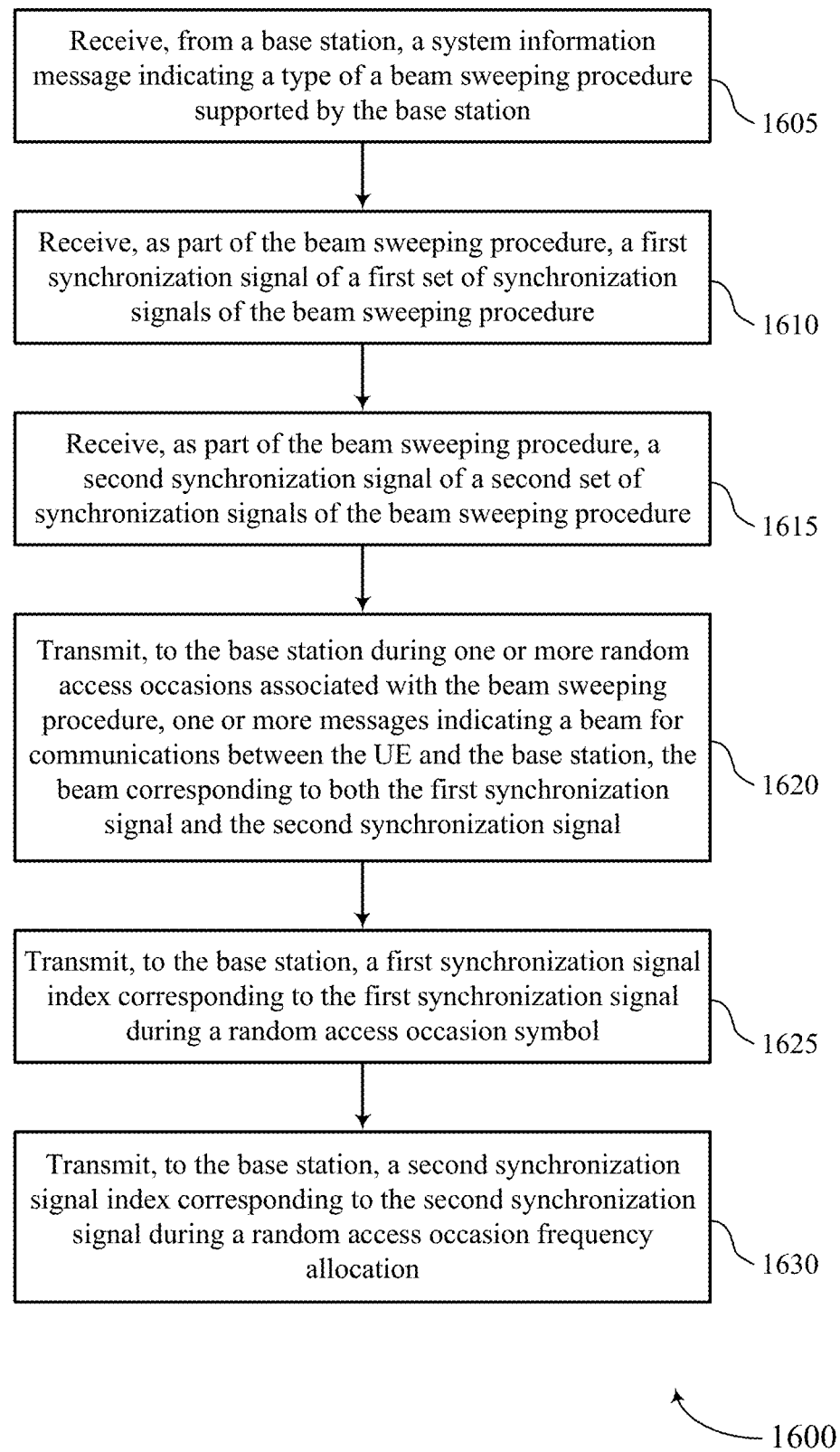

FIG. 16 shows a flowchart illustrating a method 1600 that supports reduced overhead beam sweep for initial access in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a system information message indicating a type of a beam sweeping procedure supported by the base station. The operations of 1605 may be performed in accordance with examples as disclosed herein. In some examples, aspects of the operations of 1605 may be performed by a system information receiver component 725 as described with reference to FIG. 7.

At 1610, the method may include receiving, as part of the beam sweeping procedure, a first synchronization signal of a first set of synchronization signals of the beam sweeping procedure. The operations of 1610 may be performed in accordance with examples as disclosed herein. In some examples, aspects of the operations of 1610 may be performed by an SSB receiver component 730 as described with reference to FIG. 7.

At 1615, the method may include receiving, as part of the beam sweeping procedure, a second synchronization signal of a second set of synchronization signals of the beam sweeping procedure. The operations of 1615 may be performed in accordance with examples as disclosed herein. In some examples, aspects of the operations of 1615 may be performed by an SSB receiver component 730 as described with reference to FIG. 7.

At 1620, the method may include transmitting, to the base station during one or more random access occasions associated with the beam sweeping procedure, one or more messages indicating a beam for communications between the UE and the base station, the beam corresponding to both the first synchronization signal and the second synchronization signal. The operations of 1620 may be performed in accordance with examples as disclosed herein. In some examples, aspects of the operations of 1620 may be performed by a beam indication component 735 as described with reference to FIG. 7.

At 1625, the method may include transmitting, to the base station, a first synchronization signal index corresponding to the first synchronization signal during a random access occasion symbol. The operations of 1625 may be performed in accordance with examples as disclosed herein. In some examples, aspects of the operations of 1625 may be performed by an SSB index transmission component 740 as described with reference to FIG. 7.

At 1630, the method may include transmitting, to the base station, a second synchronization signal index corresponding to the second synchronization signal during a random access occasion frequency allocation. The operations of 1630 may be performed in accordance with examples as disclosed herein. In some examples, aspects of the operations of 1630 may be performed by an SSB index transmission component 740 as described with reference to FIG. 7.

Figure 17:
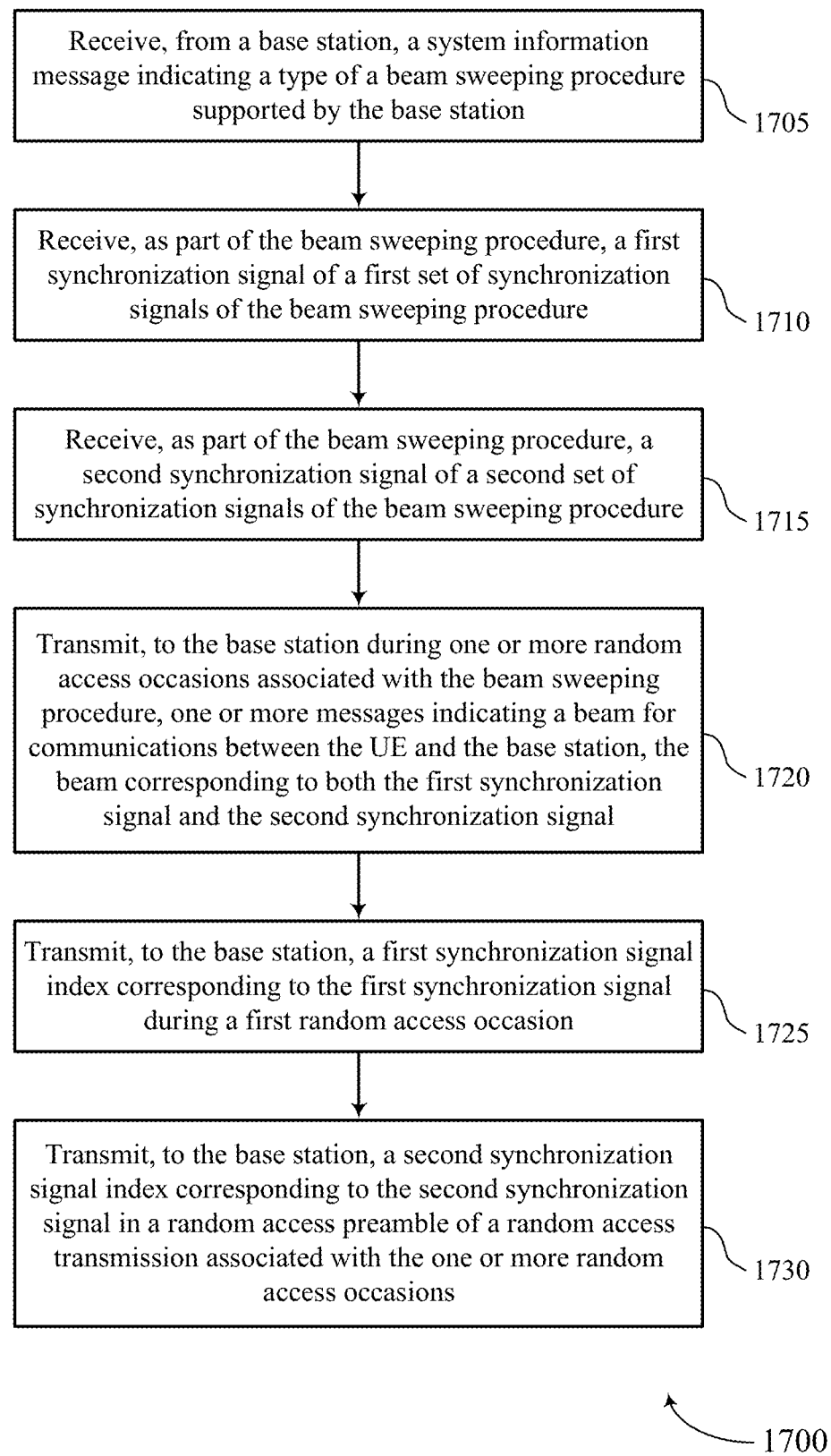

FIG. 17 shows a flowchart illustrating a method 1700 that supports reduced overhead beam sweep for initial access in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a system information message indicating a type of a beam sweeping procedure supported by the base station. The operations of 1705 may be performed in accordance with examples as disclosed herein. In some examples, aspects of the operations of 1705 may be performed by a system information receiver component 725 as described with reference to FIG. 7.

At 1710, the method may include receiving, as part of the beam sweeping procedure, a first synchronization signal of a first set of synchronization signals of the beam sweeping procedure. The operations of 1710 may be performed in accordance with examples as disclosed herein. In some examples, aspects of the operations of 1710 may be performed by an SSB receiver component 730 as described with reference to FIG. 7.

At 1715, the method may include receiving, as part of the beam sweeping procedure, a second synchronization signal of a second set of synchronization signals of the beam sweeping procedure. The operations of 1715 may be performed in accordance with examples as disclosed herein. In some examples, aspects of the operations of 1715 may be performed by an SSB receiver component 730 as described with reference to FIG. 7.

At 1720, the method may include transmitting, to the base station during one or more random access occasions associated with the beam sweeping procedure, one or more messages indicating a beam for communications between the UE and the base station, the beam corresponding to both the first synchronization signal and the second synchronization signal. The operations of 1720 may be performed in accordance with examples as disclosed herein. In some examples, aspects of the operations of 1720 may be performed by a beam indication component 735 as described with reference to FIG. 7.

At 1725, the method may include transmitting, to the base station, a first synchronization signal index corresponding to the first synchronization signal during a first random access occasion. The operations of 1725 may be performed in accordance with examples as disclosed herein. In some examples, aspects of the operations of 1725 may be performed by an SSB index transmission component 740 as described with reference to FIG. 7.

At 1730, the method may include transmitting, to the base station, a second synchronization signal index corresponding to the second synchronization signal in a random access preamble of a random access transmission associated with the one or more random access occasions. The operations of 1730 may be performed in accordance with examples as disclosed herein. In some examples, aspects of the operations of 1730 may be performed by an SSB index transmission component 740 as described with reference to FIG. 7.

Figure 18:
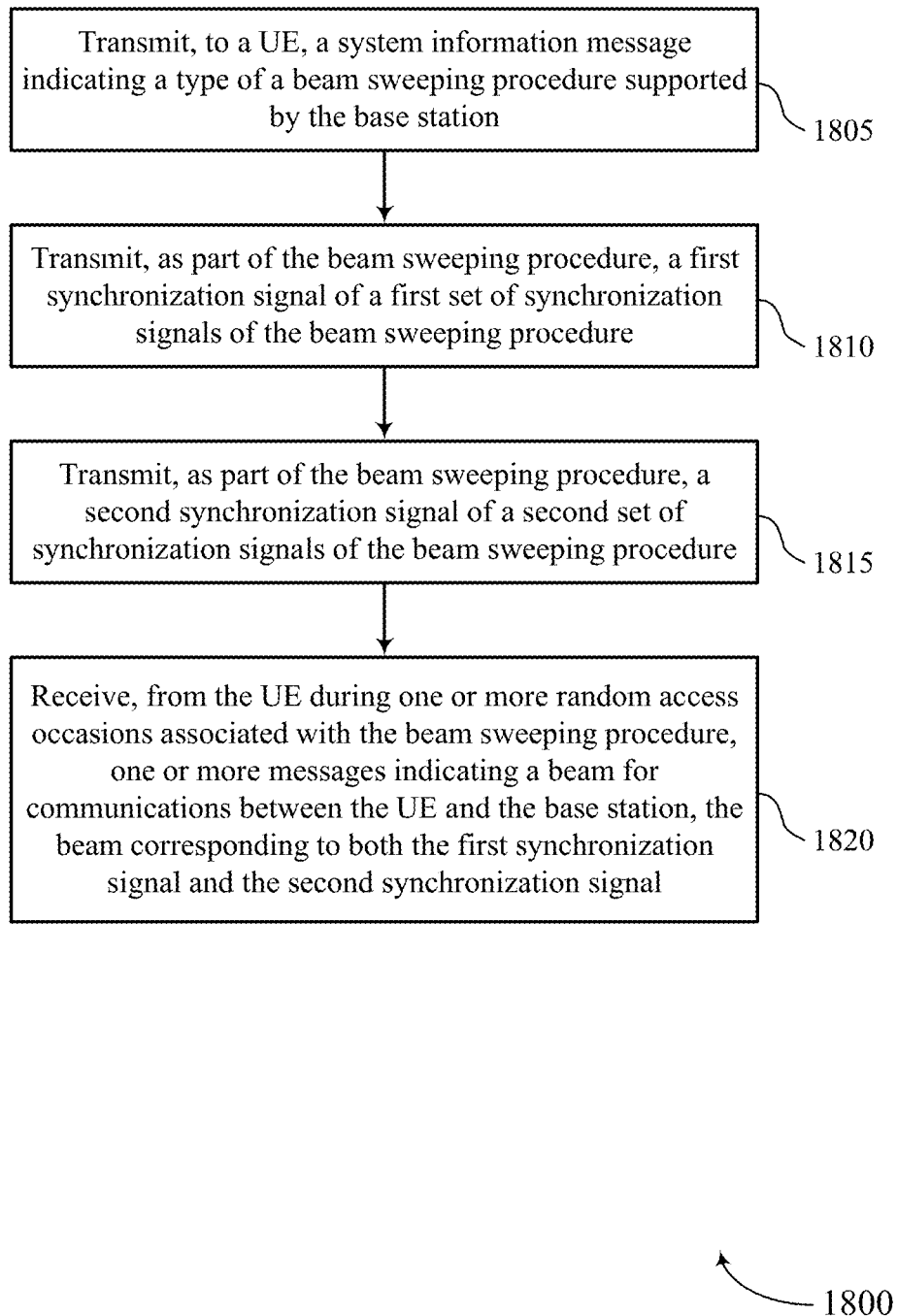

FIG. 18 shows a flowchart illustrating a method 1800 that supports reduced overhead beam sweep for initial access in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a system information message indicating a type of a beam sweeping procedure supported by the base station. The operations of 1805 may be performed in accordance with examples as disclosed herein. In some examples, aspects of the operations of 1805 may be performed by a system information transmission component 1125 as described with reference to FIG. 11.

At 1810, the method may include transmitting, as part of the beam sweeping procedure, a first synchronization signal of a first set of synchronization signals of the beam sweeping procedure. The operations of 1810 may be performed in accordance with examples as disclosed herein. In some examples, aspects of the operations of 1810 may be performed by an SSB transmission component 1130 as described with reference to FIG. 11.

At 1815, the method may include transmitting, as part of the beam sweeping procedure, a second synchronization signal of a second set of synchronization signals of the beam sweeping procedure. The operations of 1815 may be performed in accordance with examples as disclosed herein. In some examples, aspects of the operations of 1815 may be performed by an SSB transmission component 1130 as described with reference to FIG. 11.

At 1820, the method may include receiving, from the UE during one or more random access occasions associated with the beam sweeping procedure, one or more messages indicating a beam for communications between the UE and the base station, the beam corresponding to both the first synchronization signal and the second synchronization signal. The operations of 1820 may be performed in accordance with examples as disclosed herein. In some examples, aspects of the operations of 1820 may be performed by a beam indication receiver component 1135 as described with reference to FIG. 11.

The following provides an overview of aspects of the present disclosure:

Aspect 1: A method for wireless communications at a UE, comprising: receiving, from a base station, a system information message indicating a type of a beam sweeping procedure supported by the base station; receiving, as part of the beam sweeping procedure, a first synchronization signal of a first set of synchronization signals of the beam sweeping procedure; receiving, as part of the beam sweeping procedure, a second synchronization signal of a second set of synchronization signals of the beam sweeping procedure; and transmitting, to the base station during one or more RACH occasions associated with the beam sweeping procedure, one or more messages indicating a beam for communications between the UE and the base station, the beam corresponding to both the first synchronization signal and the second synchronization signal.

Aspect 2: The method of aspect 1, further comprising: transmitting, to the base station during a first RACH occasion, a first message comprising a first synchronization signal index corresponding to the first synchronization signal and a second synchronization signal index corresponding to the second synchronization signal.

Aspect 3: The method of any of aspects 1 through 2, further comprising: transmitting, to the base station in a first RACH occasion, a first message comprising a first synchronization signal index corresponding to the first synchronization signal; and transmitting, to the base station in a second RACH occasion, a second message comprising a second synchronization signal index corresponding to the second synchronization signal.

Aspect 4: The method of aspect 3, wherein the first RACH occasion is different from the second RACH occasion.

Aspect 5: The method of any of aspects 1 through 4, wherein the beam sweeping procedure comprises a first beam sweep and a second beam sweep, the method further comprising: receiving the first set of synchronization signals during the first beam sweep according to a plurality of elevation coordinates; and receiving the second set of synchronization signals during the second beam sweep according to a plurality of azimuthal coordinates.

Aspect 6: The method of aspect 5, further comprising: transmitting a first synchronization signal index corresponding to the first synchronization signal during a first time period corresponding to the first beam sweep; and transmitting a second synchronization signal index corresponding to the second synchronization signal during a second time period corresponding to the second beam sweep.

Aspect 7: The method of any of aspects 1 through 6, further comprising: transmitting, to the base station, a first synchronization signal index corresponding to the first synchronization signal during a RACH occasion symbol; and transmitting, to the base station, a second synchronization signal index corresponding to the second synchronization signal during a RACH occasion frequency allocation.

Aspect 8: The method of any of aspects 1 through 7, further comprising: transmitting, to the base station, a first synchronization signal index corresponding to the first synchronization signal during a first RACH occasion; and transmitting, to the base station, a second synchronization signal index corresponding to the second synchronization signal in a RACH preamble of a RACH transmission associated with the one or more RACH occasions.

Aspect 9: The method of any of aspects 1 through 8, wherein the first set of synchronization signals are associated with a plurality of elevation coordinates and the second set of synchronization signals are associated with a plurality of azimuthal coordinates.

Aspect 10: The method of any of aspects 1 through 9, further comprising: receiving, from the base station, a downlink message on the beam corresponding to both the first synchronization signal and the second synchronization signal based at least in part on the beam sweeping procedure.

Aspect 11: The method of any of aspects 1 through 10, wherein the first set of synchronization signals and the second set of synchronization signals are mapped to respective RACH occasions of the one or more RACH occasions based at least in part on the beam sweeping procedure.

Aspect 12: A method for wireless communications at a base station, comprising: transmitting, to a UE, a system information message indicating a type of a beam sweeping procedure supported by the base station; transmitting, as part of the beam sweeping procedure, a first synchronization signal of a first set of synchronization signals of the beam sweeping procedure; transmitting, as part of the beam sweeping procedure, a second synchronization signal of a second set of synchronization signals of the beam sweeping procedure; and receiving, from the UE during one or more RACH occasions associated with the beam sweeping procedure, one or more messages indicating a beam for communications between the UE and the base station, the beam corresponding to both the first synchronization signal and the second synchronization signal.

Aspect 13: The method of aspect 12, further comprising: receiving, from the UE during a first RACH occasion, a first message comprising a first synchronization signal index corresponding to the first synchronization signal and a second synchronization signal index corresponding to the second synchronization signal.

Aspect 14: The method of any of aspects 12 through 13, further comprising: receiving, from the UE in a first RACH occasion, a first message comprising a first synchronization signal index corresponding to the first synchronization signal; and receiving, from the UE in a second RACH occasion, a second message comprising a second synchronization signal index corresponding to the second synchronization signal.

Aspect 15: The method of aspect 14, wherein the first RACH occasion is different from the second RACH occasion.

Aspect 16: The method of any of aspects 12 through 15, wherein the beam sweeping procedure comprises a first beam sweep and a second beam sweep, the method further comprising: transmitting, to the UE, the first set of synchronization signals during the first beam sweep according to a plurality of elevation coordinates; and transmitting, to the UE, the second set of synchronization signals during the second beam sweep according to a plurality of azimuthal coordinates.

Aspect 17: The method of aspect 16, further comprising: receiving a first synchronization signal index corresponding to the first synchronization signal during a first time period corresponding to the first beam sweep; and receiving a second synchronization signal index corresponding to the second synchronization signal during a second time period corresponding to the second beam sweep.

Aspect 18: The method of any of aspects 12 through 17, further comprising: receiving, from the UE, a first synchronization signal index corresponding to the first synchronization signal during a RACH occasion symbol; and transmitting, to the UE, a second synchronization signal index corresponding to the second synchronization signal during a RACH occasion frequency allocation.

Aspect 19: The method of any of aspects 12 through 18, further comprising: receiving, from the UE, a first synchronization signal index corresponding to the first synchronization signal during a first RACH occasion; and receiving, from the UE, a second synchronization signal index corresponding to the second synchronization signal in a RACH preamble of a RACH transmission associated with the one or more RACH occasions.

Aspect 20: The method of any of aspects 12 through 19, wherein the first set of synchronization signals are associated with a plurality of elevation coordinates and the second set of synchronization signals are associated with a plurality of azimuthal coordinates.

Aspect 21: The method of any of aspects 12 through 20, further comprising: transmitting, to the UE, a downlink message on the beam corresponding to both the first synchronization signal and the second synchronization signal based at least in part on the beam sweeping procedure.

Aspect 22: The method of any of aspects 12 through 21, wherein the first set of synchronization signals and the second set of synchronization signals are mapped to respective RACH occasions of the one or more RACH occasions based at least in part on the beam sweeping procedure.

Aspect 23: An apparatus for wireless communications at a UE, comprising a processor; memory coupled with the processor; and instructions stored in the memory and executable by the processor to cause the apparatus to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a base station, comprising a processor; memory coupled with the processor; and instructions stored in the memory and executable by the processor to cause the apparatus to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a system information message indicating a type of a beam sweeping procedure supported by a network device;
    receiving, as part of the beam sweeping procedure, a first synchronization signal of a first set of synchronization signals of the beam sweeping procedure according to a plurality of narrow elevation coordinates and according to a plurality of wide azimuthal coordinates;
    receiving, as part of the beam sweeping procedure, a second synchronization signal of a second set of synchronization signals of the beam sweeping procedure according to a plurality of narrow azimuthal coordinates and according to a plurality of wide elevation coordinates;
    transmitting, during a first random access occasion of one or more random access occasions associated with the beam sweeping procedure, one or more messages comprising a first synchronization signal index corresponding to both the first synchronization signal and a wide elevation coordinate of the plurality of wide elevation coordinates; and
    transmitting, in a random access preamble of a random access transmission associated with the one or more random access occasions, a second synchronization signal index corresponding to both the second synchronization signal and a wide azimuthal coordinate of the plurality of wide azimuthal coordinates, wherein the first synchronization signal index and the second synchronization signal index together comprise a synchronization signal index pair that indicates a narrow beam for communications at the UE.

2. The method of claim 1, wherein transmitting the one or more messages comprises:
    transmitting, during the first random access occasion, a message comprising the first synchronization signal index corresponding to the first synchronization signal and comprising the second synchronization signal index corresponding to the second synchronization signal.

3. The method of claim 1, wherein transmitting the one or more messages comprises:
    transmitting, during the first random access occasion, a first message comprising the first synchronization signal index corresponding to the first synchronization signal; and
    transmitting, during a second random access occasion, a second message comprising the second synchronization signal index corresponding to the second synchronization signal.

4. The method of claim 1, wherein transmitting the one or more messages comprises:
    transmitting the first synchronization signal index corresponding to the first synchronization signal during a first time period corresponding to a first beam sweep of the beam sweeping procedure; and
    transmitting the second synchronization signal index corresponding to the second synchronization signal during a second time period corresponding to a second beam sweep of the beam sweeping procedure.

5. The method of claim 1, wherein transmitting the one or more messages comprises:
    transmitting the first synchronization signal index corresponding to the first synchronization signal during a random access occasion symbol; and
    transmitting the second synchronization signal index corresponding to the second synchronization signal during a random access occasion frequency allocation.

6. The method of claim 1, further comprising:
    receiving a downlink message via the narrow beam corresponding to both the first synchronization signal and the second synchronization signal based at least in part on the beam sweeping procedure.

7. The method of claim 1, wherein the first set of synchronization signals and the second set of synchronization signals are mapped to respective random access occasions of the one or more random access occasions based at least in part on the beam sweeping procedure.

8. A method for wireless communications at a network device, comprising:
    transmitting a system information message indicating a type of a beam sweeping procedure supported by the network device;
    transmitting, as part of the beam sweeping procedure, a first synchronization signal of a first set of synchronization signals of the beam sweeping procedure according to a plurality of narrow elevation coordinates and according to a plurality of wide azimuthal coordinates;
    transmitting, as part of the beam sweeping procedure, a second synchronization signal of a second set of synchronization signals of the beam sweeping procedure according to a plurality of narrow azimuthal coordinates and according to a plurality of wide elevation coordinates;
    receiving, during a first random access occasion of one or more random access occasions associated with the beam sweeping procedure, one or more messages comprising a first synchronization signal index corresponding to both the first synchronization signal and a wide elevation coordinate of the plurality of wide elevation coordinates; and
    receiving, in a random access preamble of a random access transmission associated with the one or more random access occasions, a second synchronization signal index corresponding to both the second synchronization signal and a wide azimuthal coordinate of the plurality of wide azimuthal coordinates, wherein the first synchronization signal index and the second synchronization signal index together comprise a synchronization signal index pair that indicates a narrow beam for communications at a user equipment (UE).

9. The method of claim 8, wherein receiving the one or more messages comprises:
    receiving, from the UE during the first random access occasion, a message comprising the first synchronization signal index corresponding to the first synchronization signal and comprising the second synchronization signal index corresponding to the second synchronization signal.

10. The method of claim 8, wherein receiving the one or more messages comprises:
  receiving, from the UE during the first random access occasion, a first message comprising the first synchronization signal index corresponding to the first synchronization signal; and
  receiving, from the UE during a second random access occasion, a second message comprising the second synchronization signal index corresponding to the second synchronization signal.

11. The method of claim 8, wherein receiving the one or more messages comprises:
  receiving the first synchronization signal index corresponding to the first synchronization signal during a first time period corresponding to a first beam sweep of the beam sweeping procedure; and
  receiving the second synchronization signal index corresponding to the second synchronization signal during a second time period corresponding to a second beam sweep of the beam sweeping procedure.

12. The method of claim 8, wherein receiving the one or more messages comprises:
  receiving, from the UE, the first synchronization signal index corresponding to the first synchronization signal during a random access occasion symbol; and
  receiving, from the UE, the second synchronization signal index corresponding to the second synchronization signal during a random access occasion frequency allocation.

13. The method of claim 8, further comprising:
  transmitting, to the UE, a downlink message via the narrow beam corresponding to both the first synchronization signal and the second synchronization signal based at least in part on the beam sweeping procedure.

14. The method of claim 8, wherein the first set of synchronization signals and the second set of synchronization signals are mapped to respective random access occasions of the one or more random access occasions based at least in part on the beam sweeping procedure.

15. An apparatus for wireless communications at a user equipment (UE), comprising:
  one or more processors;
  one or more memories coupled with the one or more processors; and
  instructions stored in the one or more memories and executable by the one or more processors to cause the apparatus to:
    receive a system information message indicating a type of a beam sweeping procedure supported by a network device;
    receive, as part of the beam sweeping procedure, a first synchronization signal of a first set of synchronization signals of the beam sweeping procedure according to a plurality of narrow elevation coordinates and according to a plurality of wide azimuthal coordinates;
    receive, as part of the beam sweeping procedure, a second synchronization signal of a second set of synchronization signals of the beam sweeping procedure according to a plurality of narrow azimuthal coordinates and according to a plurality of wide elevation coordinates;
    transmit, during a first random access occasion of one or more random access occasions associated with the beam sweeping procedure, one or more messages comprising a first synchronization signal index corresponding to both the first synchronization signal and a wide elevation coordinate of the plurality of wide elevation coordinates; and
    transmit, in a random access preamble of a random access transmission associated with the one or more random access occasions, a second synchronization signal index corresponding to both the second synchronization signal and a wide azimuthal coordinate of the plurality of wide azimuthal coordinates, wherein the first synchronization signal index and the second synchronization signal index together comprise a synchronization signal index pair that indicates a narrow beam for communications at the UE.

16. The apparatus of claim 15, wherein, to transmit the one or more messages, the instructions are further executable by the one or more processors to cause the apparatus to:
  transmit, during the first random access occasion, a message comprising the first synchronization signal index corresponding to the first synchronization signal and comprising the second synchronization signal index corresponding to the second synchronization signal.

17. The apparatus of claim 15, wherein, to transmit the one or more messages, the instructions are further executable by the one or more processors to cause the apparatus to:
  transmit, during the first random access occasion, a first message comprising the first synchronization signal index corresponding to the first synchronization signal; and
  transmit, during a second random access occasion, a second message comprising the second synchronization signal index corresponding to the second synchronization signal.

18. The apparatus of claim 15, wherein, to transmit the one or more messages, the instructions are further executable by the one or more processors to cause the apparatus to:
  transmit the first synchronization signal index corresponding to the first synchronization signal during a first time period corresponding to a first beam sweep of the beam sweeping procedure; and
  transmit the second synchronization signal index corresponding to the second synchronization signal during a second time period corresponding to a second beam sweep of the beam sweeping procedure.

19. The apparatus of claim 15, wherein, to transmit the one or more messages, the instructions are further executable by the one or more processors to cause the apparatus to:
  transmit the first synchronization signal index corresponding to the first synchronization signal during a random access occasion symbol; and
  transmit the second synchronization signal index corresponding to the second synchronization signal during a random access occasion frequency allocation.

20. An apparatus for wireless communications at a network device, comprising:
  one or more processors;
  one or more memories coupled with the one or more processors; and
  instructions stored in the one or more memories and executable by the one or more processors to cause the apparatus to:
  transmit a system information message indicating a type of a beam sweeping procedure supported by the network device;
  transmit, as part of the beam sweeping procedure, a first synchronization signal of a first set of synchronization signals of the beam sweeping procedure according to a plurality of narrow elevation coordinates and according to a plurality of wide azimuthal coordinates;

transmit, as part of the beam sweeping procedure, a second synchronization signal of a second set of synchronization signals of the beam sweeping procedure according to a plurality of narrow azimuthal coordinates and according to a plurality of wide elevation coordinates;

receive, during a first random access occasion of one or more random access occasions associated with the beam sweeping procedure, one or more messages comprising a first synchronization signal index corresponding to both the first synchronization signal and a wide elevation coordinate of the plurality of wide elevation coordinates; and receive, in a random access preamble of a random access transmission associated with the one or more random access occasions, a second synchronization signal index corresponding to both the second synchronization signal and a wide azimuthal coordinate of the plurality of wide azimuthal coordinates, wherein the first synchronization signal index and the second synchronization signal index together comprise a synchronization signal index pair that indicates a narrow beam for communications at a user equipment (UE).

* * * * *